(12) United States Patent
Tsujimoto

(10) Patent No.: US 11,623,981 B2
(45) Date of Patent: Apr. 11, 2023

(54) ULTRAHIGH-MOLECULAR-WEIGHT POLYETHYLENE POWDER

(71) Applicant: Asahi Kasei Kabushiki Kaisha, Tokyo (JP)

(72) Inventor: Koichi Tsujimoto, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 320 days.

(21) Appl. No.: 17/041,565

(22) PCT Filed: Feb. 13, 2019

(86) PCT No.: PCT/JP2019/005120
§ 371 (c)(1),
(2) Date: Sep. 25, 2020

(87) PCT Pub. No.: WO2019/187727
PCT Pub. Date: Oct. 3, 2019

(65) Prior Publication Data
US 2021/0017363 A1 Jan. 21, 2021

(30) Foreign Application Priority Data
Mar. 27, 2018 (JP) .............................. JP2018-059965

(51) Int. Cl.
*C08F 210/16* (2006.01)
*C08L 23/16* (2006.01)
*C08L 23/06* (2006.01)
*H01M 50/411* (2021.01)
*C08J 3/12* (2006.01)
*C08L 23/08* (2006.01)
*C08F 110/02* (2006.01)
*C08F 10/02* (2006.01)

(52) U.S. Cl.
CPC ................ *C08L 23/06* (2013.01); *C08J 3/12* (2013.01); *C08L 23/0815* (2013.01); *H01M 50/411* (2021.01); *C08F 10/02* (2013.01); *C08F 110/02* (2013.01); *C08F 210/16* (2013.01); *C08F 2500/01* (2013.01); *C08F 2500/18* (2013.01); *C08L 2207/068* (2013.01)

(58) Field of Classification Search
CPC ...... C08F 210/16; C08F 10/02; C08F 110/02; C08F 2500/01; C08F 2500/18; C08L 23/0815; C08L 23/06; C08L 2207/068
See application file for complete search history.

(56) References Cited

U.S. PATENT DOCUMENTS

| | | | | |
|---|---|---|---|---|
| 10,808,108 B2 * | 10/2020 | Tsujimoto | ............... | C08L 23/06 |
| 2011/0311878 A1 | 12/2011 | Inagaki et al. | | |
| 2015/0299903 A1 | 10/2015 | Tanaka et al. | | |
| 2019/0002611 A1 | 1/2019 | Hamada | | |

FOREIGN PATENT DOCUMENTS

| | | | | |
|---|---|---|---|---|
| CN | 101654492 A | 2/2010 | | |
| EP | 3279225 A1 * | 2/2018 | ............ | C08F 210/16 |
| JP | H07-118326 A | 5/1995 | | |
| JP | 2002-124237 A * | 4/2002 | ............. | H01M 2/16 |
| JP | 2011-111559 A | 6/2011 | | |
| JP | 2014-040525 A | 3/2014 | | |
| JP | 2015-071737 A | 4/2015 | | |
| JP | 2016-108475 A | 6/2016 | | |
| JP | 2017-088773 A | 5/2017 | | |
| JP | 2017-137432 A | 8/2017 | | |
| JP | 2017-145306 A | 8/2017 | | |
| JP | 2018-095862 A | 6/2018 | | |
| KR | 10-2011-0086180 A | 7/2011 | | |
| KR | 10-2015-0120872 A | 10/2015 | | |
| KR | 10-2017-0120091 A | 10/2017 | | |
| WO | WO 2017/163848 A1 * | 9/2017 | ............ | C08F 210/16 |

OTHER PUBLICATIONS

Barnetson et al., "Observastions on the sintering of ultra-high molecular weight polyethylene (UHMWPE) powders," Journal of Materials Science Letters, 14 (2): 80-84 (1995).
Supplementary European Search Report issued in corresponding European Patent Application No. 19777350.0 dated Apr. 29, 2021.
International Search Report issued in corresponding International Patent Application No. PCT/JP2019/005120 dated Apr. 23, 2019.

* cited by examiner

*Primary Examiner* — Rip A Lee
(74) *Attorney, Agent, or Firm* — Morgan, Lewis & Bockius LLP

(57) ABSTRACT

The ultrahigh-molecular-weight polyethylene powder of the present invention is an ultrahigh-molecular-weight polyethylene powder having a viscosity-average molecular weight Mv of $10 \times 10^4$ or higher and $1000 \times 10^4$ or lower, wherein viscosity-average molecular weight Mv(A) of a kneaded product obtained by kneading under specific kneading conditions, and the Mv satisfy the following relationship: "$\{Mv-Mv(A)\}/Mv$ is 0.20 or less", and the ultrahigh-molecular-weight polyethylene powder contains an ultrahigh-molecular-weight polyethylene powder having a particle size of 212 μm or larger, wherein the powder having a particle size of 212 μm or larger has an average pore volume of 0.6 ml/g or larger and an average pore size of 0.3 μm or larger.

20 Claims, No Drawings

ULTRAHIGH-MOLECULAR-WEIGHT POLYETHYLENE POWDER

TECHNICAL FIELD

The present invention relates to an ultrahigh-molecular-weight polyethylene powder.

BACKGROUND ART

Ultrahigh-molecular-weight polyethylene is excellent in impact resistance and abrasion resistance and is therefore used as an engineering plastic in various fields.

For use in such fields, the processability of ultrahigh-molecular-weight polyethylene is important, and a method of, for example, Patent document 1 is disclosed from the viewpoint of improvement in processability. Specifically, Patent document 1 discloses an ultrahigh-molecular-weight polyethylene resin composition that has excellent molding processability while exploiting the original properties of ultrahigh-molecular-weight polyethylene, such as high strength, abrasion resistance, lubricity, hygiene, and chemical resistance, and offers a molded article excellent in appearance and mechanical strength, and a method for producing the same.

LIST OF PRIOR ART DOCUMENTS

Patent Document

Patent document 1: Japanese Patent Laid-Open No. 2016-108475

SUMMARY OF INVENTION

Problems to be Solved by Invention

However, the ultrahigh-molecular-weight polyethylene resin composition described in Patent document 1 is a composition consisting of an ultrahigh-molecular-weight polyethylene resin and a polyolefin resin other than the ultrahigh-molecular-weight polyethylene resin. No discussion has been made on appearance, ease of processing and reduction in the amount of lamp black during processing of ultrahigh-molecular-weight polyethylene alone.

Also, the ultrahigh-molecular-weight polyethylene has a much higher molecular weight than that of general-purpose polyethylene and is therefore expected to produce a molded product having high strength and high elasticity if the ultrahigh-molecular-weight polyethylene can be highly oriented. However, the high orientation of the ultrahigh-molecular-weight polyethylene requires sufficiently disentangling the molecular chain. For this reason, the ultrahigh-molecular-weight polyethylene has heretofore been sufficiently impregnated with a solvent before kneading. Since improvement in the production efficiency of ultrahigh-molecular-weight polyethylene has been demanded in recent years, the ultrahigh-molecular-weight polyethylene is kneaded in a state that is not sufficiently impregnated with a solvent in order to shorten a processing time. This breaks the molecular chain of the resulting ultrahigh-molecular-weight polyethylene due to shear during kneading because the molecular chain is not disentangled. As a result, strength is disadvantageously reduced, though high orientation is achieved.

The present invention has been made in light of the problems described above, and an object of the present invention is to provide an ultrahigh-molecular-weight polyethylene powder that is excellent in appearance, ease of processing, and reduction in the amount of lamp black during processing and achieves both of high strength and high drawing.

Means for Solving Problems

The present inventor has conducted diligent studies to attain the object and consequently completed the present invention by finding that a predetermined ultrahigh-molecular-weight polyethylene powder can attain the object.

Specifically, the present invention is as follows:

(1)

An ultrahigh-molecular-weight polyethylene powder having a viscosity-average molecular weight Mv of $10 \times 10^4$ or higher and $1000 \times 10^4$ or lower, wherein viscosity-average molecular weight Mv(A) of a kneaded product obtained by kneading under kneading conditions given below and the Mv satisfy the following relationship:

$\{Mv-Mv(A)\}/Mv$ is 0.20 or less, and the ultrahigh-molecular-weight polyethylene powder contains an ultrahigh-molecular-weight polyethylene powder having a particle size of 212 μm or larger, wherein the powder having a particle size of 212 μm or larger has an average pore volume of 0.6 ml/g or larger and an average pore size of 0.3 μm or larger:

[Kneading Conditions for Obtaining the Kneaded Product Having Viscosity-Average Molecular Weight Mv(A)]

Raw Material:

a mixture containing 5 parts by mass of the ultrahigh-molecular-weight polyethylene powder and 95 parts by mass of liquid paraffin, and further 1 part by mass of an antioxidant per 100 parts by mass in total of the ultrahigh-molecular-weight polyethylene powder and the liquid paraffin, and conditions:

the raw material is kneaded at 130° C. for 30 minutes and then further kneaded at 240° C. for 15 minutes;

the heating rate from 130° C. to 240° C. is set to 22° C./min;

the number of screw rotations is set to 50 rpm; and the measurement is performed in the nitrogen atmosphere.

(2)

The ultrahigh-molecular-weight polyethylene powder according to (1), wherein the proportion of an ultrahigh-molecular-weight polyethylene powder having a particle size of 53 μm or smaller is less than 40% by mass per 100% by mass of the ultrahigh-molecular-weight polyethylene powder.

(3)

The ultrahigh-molecular-weight polyethylene powder according to (1) or (2), wherein the bulk density of the powder having a particle size of 212 μm or larger is 0.20 g/cm$^3$ or higher and 0.60 g/cm$^3$ or lower.

(4)

The ultrahigh-molecular-weight polyethylene powder according to any of (1) to (3), wherein the ultrahigh-molecular-weight polyethylene powder has a magnesium content of 0.1 ppm or higher and 20 ppm or lower.

(5)

The ultrahigh-molecular-weight polyethylene powder according to any of (1) to (4), wherein the ultrahigh-molecular-weight polyethylene powder has a titanium content of 0.1 ppm or higher and 5 ppm or lower.

(6)

The ultrahigh-molecular-weight polyethylene powder according to any of (1) to (5), wherein the ultrahigh-molecular-weight polyethylene powder has an aluminum content of 0.5 ppm or higher and 10 ppm or lower.

(7)

The ultrahigh-molecular-weight polyethylene powder according to any of (1) to (6), wherein the ultrahigh-molecular-weight polyethylene powder has a silicon content of 0.1 ppm or higher and 100 ppm or lower.

(8)

The ultrahigh-molecular-weight polyethylene powder according to any of (1) to (7), wherein the ultrahigh-molecular-weight polyethylene powder has a chlorine content of 1 ppm or higher and 50 ppm or lower.

(9)

The ultrahigh-molecular-weight polyethylene powder according to any of (1) to (8), wherein the content ratio between magnesium and titanium (Mg/Ti) is 0.1 or more and 10 or less.

(10)

The ultrahigh-molecular-weight polyethylene powder according to any of (1) to (9), wherein the content ratio between aluminum and titanium (Al/Ti) is 0.1 or more and 20 or less.

(11)

A high-strength fiber comprising an ultrahigh-molecular-weight polyethylene powder according to any of (1) to (10).

(12)

A microporous membrane for secondary battery separators comprising an ultrahigh-molecular-weight polyethylene powder according to any of (1) to (10).

Advantages of Invention

The present invention can provide an ultrahigh-molecular-weight polyethylene powder that is excellent in appearance of a molded product, ease of processing, and reduction in the amount of lamp black during processing and achieves both of high strength and high drawing.

MODE FOR CARRYING OUT INVENTION

Hereinafter, a mode for carrying out the present invention (hereinafter, simply referred to as the "present embodiment") will be described in detail. However, the present invention is not intended to be limited thereby. Various changes or modifications can be made in the present invention without departing from the spirit thereof.

[Ultrahigh-Molecular-Weight Polyethylene Powder]

The ultrahigh-molecular-weight polyethylene powder (hereinafter, also simply referred to as the "powder") of the present embodiment has a viscosity-average molecular weight of $10 \times 10^4$ or higher and $1000 \times 10^4$ or lower.

The viscosity-average molecular weight is preferably in the range of $10 \times 10^4$ or higher and $950 \times 10^4$ or lower, more preferably in the range of $20 \times 10^4$ or higher and $900 \times 10^4$ or lower, from the viewpoint of moldability and final physical properties. In the present embodiment, the viscosity-average molecular weight refers to a value determined by determining an intrinsic viscosity from the specific viscosity of a polymer solution, and converting the intrinsic viscosity to a viscosity-average molecular weight.

The ultrahigh-molecular-weight polyethylene powder of the present embodiment is preferably a powder consisting of an ethylene homopolymer and/or a copolymer of ethylene and an olefin (hereinafter, also referred to as a comonomer) copolymerizable therewith.

Specific examples of the olefin copolymerizable with ethylene include, but are not particularly limited to, at least one comonomer selected from the group consisting of α-olefins having 3 or more and 15 or less carbon atoms, cyclic olefins having 3 or more and 15 or less carbon atoms, compounds represented by the formula $CH_2=CHR^1$ (wherein $R^1$ is an aryl group having 6 to 12 carbon atoms), and linear, branched, or cyclic dienes having 3 or more and 15 or less carbon atoms. Among them, an α-olefin having 3 or more and 15 or less carbon atoms is preferred.

Examples of the α-olefin include, but are not particularly limited to, propylene, 1-butene, 4-methyl-1-pentene, 1-hexene, 1-octene, 1-nonene, 1-decene, 1-undecene, 1-dodecene, 1-tridecene, and 1-tetradecene.

When the ethylene polymer for use in the present embodiment comprises a comonomer, the content of the comonomer unit in the ethylene polymer is preferably 0.01% by mol or more and 5% by mol or less, more preferably 0.01% by mol or more and 2% by mol or less, further preferably 0.01% by mol or more and 1% by mol or less. The amount of the comonomer is preferably 5% by mol or less from the viewpoint of reduction in the rate of decomposition.

[Viscosity-Average Molecular Weight]

The viscosity-average molecular weight (Mv) of the ultrahigh-molecular-weight polyethylene powder of the present embodiment is $10 \times 10^4$ or higher and $1000 \times 10^4$ or lower, preferably $100 \times 10^4$ or higher and $950 \times 10^4$ or lower, more preferably $200 \times 10^4$ or higher and $900 \times 10^4$ or lower.

The method for controlling the viscosity-average molecular weight (Mv) to the range mentioned above involves, for example, changing the polymerization temperature of a reactor where ethylene, or ethylene and an olefin copolymerizable therewith is (co)polymerized. The viscosity-average molecular weight (Mv) tends to be lower as the polymerization temperature is higher, and tends to be higher as the polymerization temperature is lower. Another method for controlling the viscosity-average molecular weight (Mv) to the range mentioned above involves, for example, changing the type of an organic metal compound for use as a promoter in the polymerization of ethylene, or ethylene and an olefin copolymerizable therewith. A further alternative method for controlling the viscosity-average molecular weight (Mv) to the range mentioned above involves, for example, adding a chain transfer agent in the polymerization of ethylene, or ethylene and an olefin copolymerizable therewith. The addition of the chain transfer agent tends to decrease the viscosity-average molecular weight of the ultrahigh-molecular-weight polyethylene to be produced even at the same polymerization temperature.

The present inventor has found that the kneading of the ultrahigh-molecular-weight polyethylene powder of the present embodiment using Labo Plastomill Mixer (unit model: 30C150, mixer model: R-60) manufactured by Toyo Seiki Seisaku-sho, Ltd. under the following kneading conditions suppresses the decomposition of a kneaded product, making contribution to the advantageous effects of the present invention.

[Kneading Conditions]

Raw Material:

a mixture containing 5 parts by mass of the ultrahigh-molecular-weight polyethylene powder and 95 parts by mass of liquid paraffin, and further 1 part by mass of an antioxidant per 100 parts by mass in total of the ultrahigh-molecular-weight polyethylene powder and the liquid paraffin, and Conditions:
the raw material is kneaded at 130° C. for 30 minutes and then further kneaded at 240° C. for 15 minutes;
the heating rate from 130° C. to 240° C. is set to 22° C./min;
the number of screw rotations is set to 50 rpm; and
the measurement is performed in the nitrogen atmosphere.

The liquid paraffin for use in the present embodiment can be liquid paraffin that plays a role as a plasticizer and is capable of forming a homogeneous solution at a temperature equal to or higher than the melting point of the ultrahigh-molecular-weight polyethylene powder when kneaded with the ultrahigh-molecular-weight polyethylene powder.

A nonvolatile solvent other than liquid paraffin may be used as a plasticizer for the purpose of determining the solubility and fusion properties of the ultrahigh-molecular-weight polyethylene powder. Examples of the nonvolatile solvent other than liquid paraffin include, but are not particularly limited to: hydrocarbons such as paraffin wax; esters such as dioctyl phthalate and dibutyl phthalate; and higher alcohols such as oleyl alcohol and stearyl alcohol.

The antioxidant is not particularly limited and is preferably, for example, a phenol compound or a phenol-phosphorus compound, specifically include: phenol antioxidants such as 2,6-di-t-butyl-4-methylphenol(dibutylhydroxytoluene), n-octadecyl-3-(4-hydroxy-3,5-di-t-butylphenyl)propionate, and tetrakis(methylene (3,5-di-t-butyl-4-hydroxyhydrocinnamate))methane; phenol-phosphorus antioxidants such as 6-[3-(3-t-butyl-4-hydroxy-5-methylphenyl)propoxy]-2,4,8,10-tetra-t-butyldibenzo[d,f][1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis (2,4-t-butylphenyl phosphite).

[$\{Mv-Mv(A)\}/Mv$]

As a result of kneading under the kneading conditions mentioned above, the viscosity-average molecular weight Mv of the ultrahigh-molecular-weight polyethylene powder before the kneading and viscosity-average molecular weight Mv(A) of a gel after the kneading satisfy the following relationship: $\{Mv-Mv(A)\}/Mv$ is 0.20 or less, more preferably 0.15 or less, further preferably 0.10 or less, most preferably 0.08 or less. The lower limit of $\{Mv-Mv(A)\}/Mv$ is not particularly limited and is preferably, for example, 0.04 or more.

When $\{Mv-Mv(A)\}/Mv$ is 0.20 or less, the amount of a decomposition product of the ultrahigh-molecular-weight polyethylene powder is reduced (oligomer formation ascribable to decomposition is suppressed). Reduction in the amount of gum (buildup of decomposition products such as oligomers) accumulated near the outlet of a spinneret during extrusion molding, for example, facilitates processing and can improve production efficiency. Typically, the gum accumulated near the outlet of a spinneret is thermally decomposed to increase the frequency of occurrence of lamp black. Therefore, it is necessary to temporarily halt production accordingly and remove the lamp black. By contrast, the ultrahigh-molecular-weight polyethylene powder of the present embodiment has a low frequency of occurrence of lamp black because of a small amount of gum generated in the first place and permits continuation of stable production. When $\{Mv-Mv(A)\}/Mv$ is 0.04 or more, variations in the physical properties of a molded article after processing are favorably suppressed.

[Average Pore Volume and Average Pore Size of Ultrahigh-Molecular-Weight Polyethylene Powder Having Particle Size of 212 μm or Larger]

The ultrahigh-molecular-weight polyethylene powder of the present embodiment contains an ultrahigh-molecular-weight polyethylene powder having a particle size of 212 μm or larger, and the powder having a particle size of 212 μm or larger has an average pore volume of 0.6 ml/g or larger and an average pore size of 0.3 μm or larger. The average pore volume is preferably 0.65 ml/g or larger, more preferably 0.7 ml/g or larger, and the average pore size is preferably 0.35 μm or larger, more preferably 0.4 μm or larger. The upper limit of the average pore volume is not particularly limited and is, for example, 3.0 ml/g or smaller. The upper limit of the average pore size is not particularly limited and is, for example, 1.0 μm or smaller.

The average particle size (D50) of the ultrahigh-molecular-weight polyethylene powder of the present embodiment is preferably 40 μm or larger and 200 μm or smaller, more preferably 60 μm or larger and 140 μm or smaller, further preferably 70 μm or larger and 120 μm or smaller. The upper limit of the particle size is not particularly limited and is, for example, 710 μm or smaller.

The present inventor has found that the molecular chain of the powder having a particle size of 212 μm or larger is particularly less likely to be disentangled, and found that the ultrahigh-molecular-weight polyethylene powder having the predetermined average pore volume and average pore size of the powder having a particle size of 212 μm or larger can be sufficiently impregnated with liquid paraffin so that the molecular chain is disentangled in a short time. As a result, melt kneading at a high temperature can drastically shorten the time necessary for disentangling the molecular chain, and can suppress reduction in the strength of a molded product after heating. Such disentanglement of the molecular chain in a short time can decrease stress during drawing and permits high drawing (high orientation). This means that the resulting molded product can achieve both of high strength and high drawing (high orientation). In addition, the disentanglement of the molecular chain in a short time decreases the residual stress of the molded product after drawing and can suppress the shrinkage of the molded product. As a result, a heat setting time can be drastically shortened.

The ultrahigh-molecular-weight polyethylene powder having $\{Mv-Mv(A)\}/Mv$ of 0.20 or less and having an average pore volume of 0.6 ml/g or larger and an average pore size of 0.3 μm or larger of the powder having a particle size of 212 μm or larger can be obtained by, for example, a production method mentioned later. Specifically, the temperature of a catalyst to be charged into a reactor is adjusted to a "temperature of polymerization temperature+10° C. or higher" for rapid polymerization, and in the polymerization step, baffle plates are disposed at 2 or more and 6 or less equally spaced locations in the reactor and thereby prevent uneven reaction in the system. The baffle plates are disposed from the bottom of the reactor to the top (opening) of the reactor. The length from the top of projections of the baffle plates to the side of the reactor is adjusted to 10% or more and 30% or less of the inside diameter of the reactor, and the projection width is adjusted to 10% or more and 30% or less of the circumferential length of the reactor. The average pore volume and the average pore size of the ultrahigh-molecular-weight polyethylene powder may be controlled by a slurry concentration in the reactor and can usually be increased by decreasing the slurry concentration.

In the present embodiment, specifically, {Mv−Mv(A)}/Mv and the average pore volume and the average pore size of the ultrahigh-molecular-weight polyethylene powder having a particle size of 212 μm or larger can be measured by methods described in Examples.

[Proportion of Powder Having Particle Size of 53 μm or Smaller]

In the ultrahigh-molecular-weight polyethylene powder of the present embodiment, the proportion of a powder having a particle size of 53 μm or smaller is preferably less than 40% by mass, more preferably 35% by mass or less, further preferably 30% by mass or less, still further preferably 25% by mass or less, per 100% by mass of the ultrahigh-molecular-weight polyethylene powder. A homogeneous kneaded gel can be obtained by adjusting the proportion of the powder having a particle size of 53 μm or smaller to the range described above.

The lower limit of the proportion of the powder having a particle size of 53 μm or smaller is not particularly limited and is usually 0% by mass or more.

The ultrahigh-molecular-weight polyethylene powder having the powder having a particle size of 53 μm or smaller at a proportion of less than 40% by mass, when kneaded with liquid paraffin, is melted prior to swelling of a fine powder having a particle size of 53 μm or smaller and thus tends to be able to further reduce the possibility of obtaining an inhomogeneous kneaded product (kneaded gel) ascribable to the fusion of powder particles. As a result, for example, a fiber prepared therefrom tends to be able to produce a thread having a uniform thread diameter, and a membrane prepared therefrom tends to be able to have a uniform film thickness.

The % content of the ultrahigh-molecular-weight polyethylene powder having a particle size of 53 μm or smaller can generally be controlled by adjusting the size and/or amount of a catalyst carrier for use in polymerization. The size of the catalyst carrier is adjusted to control the particle size of the produced ultrahigh-molecular-weight polyethylene powder. Alternatively, the content on a particle size basis of the produced ultrahigh-molecular-weight polyethylene powder can also be controlled by polymerization using a catalyst having a mixture of catalyst carriers having various sizes. The % content of the ultrahigh-molecular-weight polyethylene powder having a particle size of 53 μm or smaller may be adjusted by controlling a polymerization pressure. Alternatively, the % content of the ultrahigh-molecular-weight polyethylene powder having a particle size of 53 μm or smaller may be controlled by adjusting the drying temperature or the number of times of drying of the ultrahigh-molecular-weight polyethylene powder.

In the present embodiment, for example, change between in drying temperature between a pre-stage (first half of the total drying time) and a post-stage (latter half of the total drying time) (pre-stage: 60° C. or higher and lower than 70° C., post-stage: 70° C. or higher and 90° C. or lower) in the step of drying the ultrahigh-molecular-weight polyethylene powder prevents rapid drying at a high temperature and prevents the ultrahigh-molecular-weight polyethylene powder from being broken to increase the amount of a fine powder.

Specifically, the % content of the ultrahigh-molecular-weight polyethylene powder having a particle size of 53 μm or smaller can be measured by a method described in Examples.

The present inventor estimates the problems of the conventional techniques as described below. Since general ultrahigh-molecular-weight polyethylene powders have a very strongly entangled molecular chain, their moldability (processability) is improved by melt-kneading the ultrahigh-molecular-weight polyethylene powders with liquid paraffin while mixing them at a high temperature of 270° C. or higher, and thereby cleaving the molecular chain through heat energy. However, such a cleaved molecular chain produces problems associated with strength.

An ultrahigh-molecular-weight polyethylene powder having the powder having a particle size of 53 μm or smaller at a proportion of 40% by mass or more per 100% by mass thereof, when melt-kneaded with liquid paraffin while mixed therewith, is melted prior to swelling of a fine powder having a particle size of 53 μm or smaller and cannot produce a homogeneous gel due to the fusion of powder particles. The dissolution of the fused powder particles under such a circumstance requires melt-kneading the powder at a higher temperature. Even if a homogeneous gel can be obtained, the thermal decomposition of the ultrahigh-molecular-weight polyethylene powder is promoted, presenting problems associated with strength.

However, use of the ultrahigh-molecular-weight polyethylene powder of the present embodiment can solve these problems.

[Bulk Density of Ultrahigh-Molecular-Weight Polyethylene Powder Having Particle Size of 212 μm or Larger]

In the ultrahigh-molecular-weight polyethylene powder of the present embodiment, the bulk density of the powder having a particle size of 212 μm or larger is preferably 0.20 g/cm$^3$ or higher and 0.60 g/cm$^3$ or lower, more preferably 0.25 g/cm$^3$ or higher and 0.55 g/cm$^3$ or lower, further preferably 0.30 g/cm$^3$ or higher and 0.55 g/cm$^3$ or lower.

The bulk density of 0.20 g/cm$^3$ or higher of the powder having a particle size of 212 μm or larger can secure a certain space where the powder particles are in no contact when the ultrahigh-molecular-weight polyethylene powder is aggregated. This tends to be able to promote the permeation of liquid paraffin into the ultrahigh-molecular-weight polyethylene powder and reduce the occurrence of unmelted products ascribable to insoluble residues.

The ultrahigh-molecular-weight polyethylene powder having the bulk density of 0.60 g/cm$^3$ or lower of the powder having a particle size of 212 μm or larger, when sent from an extruder hopper to the inside of the extruder, tends to be able to be smoothly sent without clogging the hopper.

The bulk density generally differs depending on the catalyst used and can be controlled by the productivity of the ultrahigh-molecular-weight polyethylene powder per unit catalyst. The bulk density of the ultrahigh-molecular-weight polyethylene powder may be controlled by a polymerization temperature in polymerization for the ultrahigh-molecular-weight polyethylene powder and can be decreased by elevating the polymerization temperature. Alternatively, the bulk density of the ultrahigh-molecular-weight polyethylene powder may be controlled by a slurry concentration in a polymerization reactor and can be increased by elevating the slurry concentration.

[Mg, Ti, Al, Si, and Cl Contents in Ultrahigh-Molecular-Weight Polyethylene Powder]

The ultrahigh-molecular-weight polyethylene powder according to the present embodiment has a magnesium (Mg) content of preferably 0.1 ppm or higher and 20 ppm or lower, a titanium (Ti) content of preferably 0.1 ppm or higher and 5 ppm or lower, more preferably 0.1 ppm or higher and 4.0 ppm or lower, further preferably 0.1 ppm or higher and 3.0 ppm or lower, an aluminum (Al) content of preferably 0.5 ppm or higher and 10 ppm or lower, more preferably 0.5 ppm or higher and 7.0 ppm or lower, further preferably 0.5 ppm or higher and 6.0 ppm or lower, a silicon (Si) content of preferably 0.1 ppm or higher and 100 ppm or lower, and a chlorine (Cl) content of preferably 1 ppm or higher and 50 ppm or lower. The ultrahigh-molecular-weight polyethylene powder having the amounts of the metals thus adjusted has better thermal stability and produces a molded article having better long-term stability. Such an ultrahigh-molecular-weight polyethylene powder can be prevented from reacting with an antioxidant or a heat stabilizer to be added for processing, and thus tends to be able to suppress the coloration of a molded article ascribable to the formation of an organic metal complex. Furthermore, a fiber prepared from the ultrahigh-molecular-weight polyethylene powder having the amounts of the metals thus adjusted can produce a thread having a uniform thread diameter, and a membrane prepared therefrom can have a uniform film thickness. In general, large amounts of metals derived from catalyst residues remaining in an ultrahigh-molecular-weight polyethylene powder have a strong tendency to cause an uneven thickness of a molded article. The contents of Mg, Ti, Al, Si, and Cl in the ultrahigh-molecular-weight polyethylene powder can be controlled by the productivity of an ethylene polymer per unit catalyst. The productivity of an ethylene polymer can be controlled by a polymerization temperature, a polymerization pressure, or a slurry concentration in a reactor for production. Specifically, examples of the approach of enhancing the productivity of the ultrahigh-molecular-weight polyethylene powder according to the present embodiment include elevation of a polymerization temperature, elevation of a polymerization pressure, and/or elevation of a slurry concentration in polymerization for the ethylene polymer. In other methods, the amount of aluminum may be controlled by selecting the type of a promoter component, decreasing the concentration of the promoter component, or washing the ethylene polymer with an acid or an alkali in polymerization for the ethylene polymer. In the present embodiment, the amounts of Mg, Ti, Al, Si, and Cl can be measured by methods described in Examples.

[Mg/Ti Content Ratio and Al/Ti Content Ratio]

The Mg/Ti content ratio of the ultrahigh-molecular-weight polyethylene powder according to the present embodiment is preferably 0.1 or more and 10 or less, more preferably 0.2 or more and 9.5 or less, further preferably 0.3 or more and 9 or less. The Al/Ti content ratio of the powder is preferably 0.1 or more and 20 or less, more preferably 0.1 or more and 18 or less, further preferably 0.15 or more and 15 or less.

The ultrahigh-molecular-weight polyethylene powder having a Mg/Ti content ratio of 0.1 or more or an Al/Ti content ratio of 0.1 or more can be prevented from reacting with an antioxidant or a heat stabilizer to be added for processing, and thus tends to be able to suppress the coloration of a molded article ascribable to the formation of an organic metal complex.

The ultrahigh-molecular-weight polyethylene powder having a Mg/Ti content ratio of 10 or less or an Al/Ti content ratio of 20 or less can decrease the amount of gum generated and can suppress the frequency of occurrence of lamp black. As a result, reduction in the strength of a molded product by thermal decomposition can be suppressed.

[Method for Producing Ultrahigh-Molecular-Weight Polyethylene Powder]

(Catalytic Component)

Examples of the catalytic component for use in the production of the ultrahigh-molecular-weight polyethylene powder according to the present embodiment include, but are not particularly limited to, general Ziegler-Natta catalysts and metallocene catalysts.

<Ziegler-Natta Catalyst>

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by the following formula 1 which is soluble in an inert hydrocarbon solvent with a titanium compound (A-2) represented by the following formula 2:

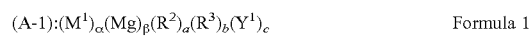

$$(A\text{-}1): (M^1)_\alpha (Mg)_\beta (R^2)_a (R^3)_b (Y^1)_c \quad \text{Formula 1}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and a, β, a, b, and c each represent a real number that satisfies the following relationships: $0 \le \alpha$, $0 < \beta$, $0 \le a$, $0 \le b$, $0 \le c$, $0 < a+b$, $0 \le c/(\alpha+\beta) \le 2$, and $n\alpha + 2\beta = a+b+c$ (wherein n represents the valence of $M^1$); and

$$(A\text{-}2): Ti(OR^7)_d X^1_{(4-d)} \quad \text{Formula 2}$$

wherein d represents a real number of 0 or larger and 4 or smaller; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane.

First, the compound (A-1) will be described. The compound (A-1) is represented in the form of an organic magnesium complex compound soluble in an inert hydrocarbon solvent, and encompasses all of dihydrocarbyl magnesium compounds and their complexes with other metal compounds. The relational expression $n\alpha + 2\beta = a+b+c$ of the symbols α, β, a, b, and c represents the stoichiometry of metal atom valence and substituents.

In the formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, pentyl, hexyl, octyl, decyl, cyclohexyl, and phenyl groups. Among them, alkyl groups are preferred. When $\alpha > 0$, a metal atom selected from the group consisting of groups 12, 13, and 14 of the periodic system can be used as the metal atom $M^1$. Examples thereof include zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, for example, a compound wherein $R^2$ is 1-methylpropyl is soluble in an inert hydrocarbon solvent. Such a compound also brings about a preferred consequence to the present embodiment. It is recommended that $R^2$ and $R^3$ satisfy any one of the following three conditions (1), (2), and (3) in the formula 1 wherein α=0.

Condition (1): at least one of $R^2$ and $R^3$ is a secondary or tertiary alkyl group having 4 or more and 6 or less carbon atoms, preferably both of $R^2$ and $R^3$ are alkyl groups having 4 or more and 6 or less carbon atoms and at least one of the groups is a secondary or tertiary alkyl group;

Condition (2): $R^2$ and $R^3$ are alkyl groups differing in the number of carbon atoms, preferably $R^2$ is an alkyl group having 2 or 3 carbon atoms and $R^3$ is an alkyl group having 4 or more carbon atoms; and Condition (3): at least one of $R^2$ and $R^3$ is a hydrocarbon group having 6 or more carbon atoms, preferably, an alkyl group wherein the total number of carbon atoms contained in $R^2$ and $R^3$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), specific examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

Alternatively, in Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderate long chain alkyl group is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In the formula 1, $Y^1$ is any of alkoxy, siloxy, allyloxy, amino, amide, —N=C—$R^4$, $R^5$, —$SR^6$ (wherein $R^4$, $R^5$, and $R^6$ each independently represent a hydrocarbon group having 2 or more and 20 or less carbon atoms), and a β-keto acid residue.

In the formula 1, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Examples include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl and 2-ethylhexyl groups are particularly preferred.

In the formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred. Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

In the present embodiment, the compound (A-1) can be synthesized by any method without particular limitations and may be synthesized by reacting, for example, an organic magnesium compound selected from the group consisting of the formulas $R^2MgX^1$ and $R^2Mg$ (wherein $R^2$ is as defined above, and $X^1$ represents halogen) with an organic metal compound selected from the group consisting of the formulas $M^1R^3_n$ and $M^1R^3_{(n-1)}H$ (wherein $M^1$ and $R^3$ are as defined above, and n represents the valence of $M^1$) at 25° C. or higher and 150° C. or lower in an inert hydrocarbon solvent and, if necessary, subsequently with a compound represented by the formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$—H, the order in which the compounds are added to the reaction system is not particularly limited. Any of the following methods can be used: for example, the compound represented by the formula $Y^1$—H is added into the organic magnesium compound; the organic magnesium compound is added into the compound represented by the formula $Y^1$—H; and both of the compounds are added at the same time.

In the present embodiment, the molar composition ratio $c/(\alpha+\beta)$ of $Y^1$ to all metal atoms in the compound (A-1) is $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by the formula 2:

$$(A-2): Ti(OR^7)_d X^1_{(4-d)} \qquad \text{Formula 2}$$

wherein d represents a real number of 0 or larger and 4 or smaller; $R^7$ represents a hydrocarbon group having 1 or more and 20 or less carbon atoms; and $X^1$ represents a halogen atom.

In the formula 2, d is preferably 0 or larger and 1 or smaller, further preferably 0. In the formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is particularly preferably titanium tetrachloride. In the present embodiment, two or more compounds selected from these compounds may be used as a mixture.

Next, the reaction between the compounds (A-1) and (A-2) will be described. The reaction is preferably carried out in an inert hydrocarbon solvent and further preferably carried out in an aliphatic hydrocarbon solvent such as hexane or heptane. In the reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is preferably within the range of −80° C. or higher and 150° C. or lower, further preferably within the range of −40° C. or higher and 100° C. or lower. The order in which the compounds (A-1) and (A-2) are added to the reaction system is not particularly limited. Any of the following methods can be used: the compound (A-2) is added subsequently to the compound (A-1); the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

Another example of the Ziegler-Natta catalytic component used in the present embodiment is preferably a catalyst for olefin polymerization comprising a solid catalytic component [C] and an organic metal compound component [B], wherein the solid catalytic component [C] is produced by reacting an organic magnesium compound (C-1) represented by the formula 3 which is soluble in an inert hydrocarbon solvent with a chlorinating agent (C-2) represented by the formula 4, and allowing an organic magnesium compound (C-4) represented by the formula 5 which is soluble in an inert hydrocarbon solvent and a titanium compound (C-5) represented by the formula 6 to be supported by a carrier (C-3) thus prepared:

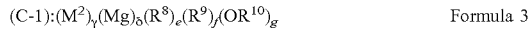

(C-1):$(M^2)_\gamma(Mg)_\delta(R^8)_e(R^9)_f(OR^{10})_g$   Formula 3 wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and $\gamma$, $\delta$, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma + 2\delta = e + f + g$ (wherein k represents the valence of $M^2$);

(C-2):$H_hSiCl_iR^{11}_{(4-(h+i))}$   Formula 4 wherein $R^{11}$ represents a hydrocarbon group having 1 or more and 12 or less carbon atoms; and h and i each represent a real number that satisfies the following relationships: $0 < h$, $0 < i$, and $0 < h+i \leq 4$;

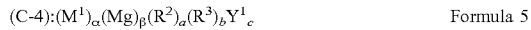

(C-4):$(M^1)_\alpha(Mg)_\beta(R^2)_a(R^3)_bY^1_c$   Formula 5 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N═C—$R^4$, $R^5$, —S$R^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha + 2\beta = a + b + c$ (wherein n represents the valence of $M^1$); and

(C-5):$Ti(OR^7)_dX^1_{(4-d)}$   Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In the formula 3, the relational expression $k\gamma + 2\delta = e + f + g$ of the symbols $\gamma$, $\delta$, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, methyl, ethyl, propyl, butyl, pentyl, hexyl, octyl, decyl, cyclohexyl, and phenyl groups. Among them, alkyl groups are preferred for each of $R^8$ and $R^9$. When $\gamma > 0$, a metal atom selected from the group consisting of groups 12, 13, and 14 of the periodic system can be used as the metal atom $M^2$. Examples thereof include zinc, boron, and aluminum. Among them, aluminum and zinc are particularly preferred.

The ratio $\delta/\gamma$ of magnesium to the metal atom $M^2$ is not particularly limited and is preferably 0.1 or more and 30 or less, further preferably 0.5 or more and 10 or less. In the case of using a predetermined organic magnesium compound wherein $\gamma = 0$, for example, a compound wherein $R^8$ is 1-methylpropyl is soluble in an inert hydrocarbon solvent. Such a compound also brings about a preferred consequence to the present embodiment. It is recommended that $R^8$ and $R^9$ satisfy any one of the following three conditions (1), (2), and (3) in the formula 3 wherein $\gamma = 0$.

Condition (1): at least one of $R^8$ and $R^9$ is a secondary or tertiary alkyl group having 4 or more and 6 or less carbon atoms, preferably, both of $R^8$ and $R^9$ are alkyl groups having 4 or more and 6 or less carbon atoms and at least one of the groups is a secondary or tertiary alkyl group;

Condition (2): $R^8$ and $R^9$ are alkyl groups differing in the number of carbon atoms, preferably, $R^8$ is an alkyl group having 2 or 3 carbon atoms and $R^9$ is an alkyl group having 4 or more carbon atoms; and Condition (3): at least one of $R^8$ and $R^9$ is a hydrocarbon group having 6 or more carbon atoms, preferably, an alkyl group wherein the total number of carbon atoms contained in $R^8$ and $R^9$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

Alternatively, in Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group ($OR^{10}$) will be described. The hydrocarbon group represented by $R^{10}$ is preferably an alkyl or aryl group having 1 or more and 12 or less carbon atoms, particularly preferably an alkyl or aryl group having 3 or more and 10 or less carbon atoms. Specific examples of $R^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the present embodiment, the compound (C-1) can be synthesized by any method without particular limitations and is preferably synthesized by a method of reacting an organic magnesium compound selected from the group consisting of the formulas $R^8MgX^1$ and $R^8Mg$ (wherein $R^8$ is as defined above, and $X^1$ represents a halogen atom) with an organic metal compound selected from the group consisting of the formulas $M^2R^9_k$ and $M^2R^9_{(k-1)}H$ (wherein $M^2$, $R^9$, and k are as defined above) at a temperature of 25° C. or higher and 150° C. or lower in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio $g/(\gamma+\delta)$ of the alkoxy group to all metal atoms in the resulting alkoxy group-containing organic magnesium compound is $0 \leq g/(\gamma+\delta) \leq 2$, preferably $0 \leq g/(\gamma+\delta) < 1$.

Next, the compound (C-2) will be described. The compound (C-2) is a silicon chloride compound having at least one Si—H bond, represented by the formula 4:

(C-2):$H_hSiCl_iR^{11}_{(4-(h+i))}$  Formula 4 wherein $R^{11}$ represents s hydrocarbon group having 1 or more and 12 or less carbon atoms; and h and i each represent a real number that satisfies the following relationships: $0 < h$, $0 < i$, and $0 < h+i \leq 4$.

In the formula 4, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 or more and 3 or less carbon atoms, such as methyl, ethyl, propyl, and 1-methylethyl group are further preferred. Each of h and i is a number larger than 0 that satisfies the relationship $h+i \leq 4$. Preferably, i is 2 or larger and 3 or smaller.

Specific examples of such a compound include, but are not particularly limited to, $HSiCl_3$, $HSiCl_2CH_3$, $HSiCl_2C_2H_5$, $HSiCl_2(C_3H_7)$, $HSiCl_2(2-C_3H_7)$, $HSiCl_2(C_4H_9)$, $HSiCl_2(C_6H_5)$, $HSiCl_2(4-Cl-C_6H_4)$, $HSiCl_2(CH=CH_2)$, $HSiCl_2(CH_2C_6H_5)$, $HSiCl_2(1-C_{10}H_7)$, $HSiCl_2(CH_2CH=CH_2)$, $H_2SiCl(CH_3)$, $H_2SiCl(C_2H_5)$, $HSiCl(CH_3)_2$, $HSiCl(C_2H_5)_2$, $HSiCl(CH_3)(2-C_3H_7)$, $HSiCl(CH_3)(C_6H_5)$, and $HSiCl(C_6H_5)_2$. These silicon chloride compounds are used each alone or as a mixture of two or more types selected from these compounds. Among them, $HSiCl_3$, $HSiCl_2CH_3$, $HSiCl(CH_3)_2$, and $HSiCl_2(C_3H_7)$ are preferred, and $HSiCl_3$ and $HSiCl_2CH_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, further preferably 0.1 mol or higher and 10 mol or lower, of silicon atom contained in the compound (C-2) per 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, the reaction temperature is preferably adjusted to a predetermined temperature by preliminarily setting the temperature of the reactor to a predetermined temperature and adjusting the temperature in the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with the silicon chloride compound to a predetermined temperature and adjusting the temperature in the reactor to a predetermined temperature while introducing the organic magnesium compound to the reactor. In the method of charging a reactor with the compound (C-1) in advance and then introducing the compound (C-2) to the reactor, the reaction temperature is preferably adjusted to a predetermined temperature by adjusting the temperature of the reactor charged with the compound (C-1) to a predetermined temperature and adjusting the temperature in the reactor to a predetermined temperature while introducing the compound (C-2) to the reactor.

Next, the organic magnesium compound (C-4) will be described. The compound (C-4) is preferably represented by the formula 5(C-4):

$$(C-4):(M^1)_\alpha(Mg)_\beta(R^2)_a(R^3)_b Y^1_c \quad \text{Formula 5}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0<β, 0≤a, 0≤b, 0<a+b, 0≤c/(α+β)≤2, and nα+2β=a+b+c (wherein n represents the valence of W).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably within the range of −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: the compound (C-5) is added subsequently to the compound (C-4); the compound (C-4) is added subsequently to the compound (C-5); and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by the formula 6:

$$(C-5):Ti(OR^7)_d X^1_{(4-d)} \quad \text{Formula 6}$$

wherein d represents a real number of 0 or larger and 4 or smaller; $R^7$ represents a hydrocarbon group having 1 or more and 20 or less carbon atoms; and $X^1$ represents a halogen atom.

In the formula 6, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by $X^1$ include, but are not particularly limited to, chlorine, bromine, and iodine. Among them, chlorine is preferred. One compound selected from these compounds may be used alone as the compound (C-5), or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio to magnesium atom contained in the carrier (C-3).

The reaction temperature for the compound (C-5) is not particularly limited and is preferably −80° C. or higher and 150° C. or lower, further preferably within the range of −40° C. or higher and 100° C. or lower.

In the present embodiment, the method for allowing the compound (C-5) to be supported by the carrier (C-3) is not particularly limited and may involve reacting an excess of the compound (C-5) with the carrier (C-3) and/or using a third component to efficiently support the compound (C-5). A method of achieving this supporting through the reaction between the compound (C-5) and the organic magnesium compound (C-4) is preferred.

Next, the organic metal compound component [B] for use in the present embodiment will be described. The solid catalytic component for use in the present embodiment can serve as a highly active catalyst for polymerization by combination with the organic metal compound component [B]. The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/or an organic magnesium compound.

Compounds represented by the formula 7 are preferably used each alone or as a mixture as the organic aluminum compound:

$$AlR^{12}_j Z^1_{(3-j)} \quad \text{Formula 7}$$

wherein $R^{12}$ represents a hydrocarbon group having 1 or more and 20 or less carbon atoms; $Z^1$ represents a group selected from the group consisting of hydrogen, halogen, alkoxy, allyloxy, and siloxy groups; and j represents any number of 2 or larger and 3 or smaller.

In the formula 7, specific examples of the hydrocarbon group having 1 or more and 20 or less carbon atoms, represented by $R^{12}$ include, but are not particularly limited to, aliphatic hydrocarbons, aromatic hydrocarbons, and alicyclic hydrocarbons, for example, trialkyl aluminum compounds such as trimethyl aluminum, triethyl aluminum, tripropyl aluminum, tributyl aluminum, tri(2-methylpropyl) aluminum (or triisobutyl aluminum), tripentyl aluminum, tri(3-methylbutyl) aluminum, trihexyl aluminum, trioctyl aluminum, and tridecyl aluminum; aluminum halide compounds such as diethyl aluminum chloride, ethyl aluminum dichloride, bis(2-methylpropyl) aluminum chloride, ethyl aluminum sesquichloride, and diethyl aluminum bromide; alkoxy aluminum compounds such as diethyl aluminum ethoxide and bis(2-methylpropyl) aluminum butoxide;

siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by the formula 3 which is soluble in an inert hydrocarbon solvent:

$$(M^2)_\gamma(Mg)_\delta(R^8)_e(R^9)_f(OR^{10})_g \quad \text{Formula 3}$$

wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: 0≤γ, 0<δ, 0≤e, 0≤f, 0≤g, 0<e+f, 0≤g/(γ+δ)≤2, and kγ+2δ=e+f+g (wherein k represents the valence of $M^2$).

This organic magnesium compound is represented in the form of an organic magnesium complex compound soluble in an inert hydrocarbon solvent, but encompasses all of dialkyl magnesium compounds and their complexes with other metal compounds. Although γ, δ, e, f, g, $M^2$, $R^8$, $R^9$, and $OR^{10}$ are as already defined, this organic magnesium compound is preferably a compound wherein the ratio δ/γ is in the range of 0.5 or more and 10 or less, more preferably a compound wherein $M^2$ is aluminum, because a compound having higher solubility in an inert hydrocarbon solvent is more preferred.

The ratio between the solid catalytic component and the organic metal compound component [B] to be combined is not particularly limited and is preferably 1 mmol or higher and 3,000 mmol or lower of the organic metal compound component [B] per g of the solid catalytic component.

<Metallocene Catalyst>

A general transition metal compound is used in cases using the metallocene catalyst. Examples of the method for producing the metallocene catalyst include, but are not particularly limited to, a production method described in Japanese Patent No. 4868853. Such a metallocene catalyst is constituted by: two catalytic components of a) a transition metal compound having a cyclic η-binding anionic ligand and b) an activating agent capable of forming a complex that exerts catalytic activity through reaction with the transition metal compound.

The transition metal compound having a cyclic η-binding anionic ligand used in the present embodiment can be represented by, for example, the following formula 8:

$$L^1_j W_k M^3 X^2_p X^3_q \quad \text{Formula 8}$$

In the formula 8, each $L^1$ independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents each independently represent a substituent having up to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups.

In the formula 8, $M^3$ represents a transition metal selected from transition metal groups belonging to group 4 of the periodic system, wherein the formal oxidation number is +2, +3, or +4, and this transition metal is bonded to at least one ligand $L^1$ via $\eta^5$ bond.

In the formula 8, W represents a divalent substituent having up to 50 non-hydrogen atoms, and this divalent substituent monovalently binds to each of $L^1$ and $M^3$ and thereby forms a metallacycle in collaboration with $L^1$ and $M^3$. Each $X^2$ independently represents an anionic σ-binding type ligand having up to 60 non-hydrogen atoms, selected from the group consisting of a monovalent anionic σ-binding type ligand, a divalent anionic σ-binding type ligand divalently binding to $M^3$, and a divalent anionic σ-binding type ligand monovalently binding to each of $L^1$ and $M^3$.

In the formula 8, each $X^2$ independently represents a neutral Lewis base-coordinating compound having up to 40 non-hydrogen atoms, and $X^3$ represents a neutral Lewis base-coordinating compound.

j is 1 or 2 provided that when j is 2, two ligands $L^1$ are optionally bonded to each other via a divalent group having up to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group.

k is 0 or 1. p is 0, 1, or 2 provided that: when $X^2$ is a monovalent anionic σ-binding type ligand or a divalent anionic σ-binding type ligand binding to $L^1$ and $M^3$, p is an integer smaller by at least 1 than the formal oxidation number of $M^3$; and when $X^2$ is a divalent anionic σ-binding type ligand binding only to $M^3$, p is an integer smaller by at least (j+1) than the formal oxidation number of $M^3$. q is 0, 1, or 2.

Examples of the ligand $X^2$ in the compound of the formula 8 include halides, hydrocarbon groups having 1 to 60 carbon atoms, hydrocarbyloxy groups having 1 to 60 carbon atoms, hydrocarbylamide groups having 1 to 60 carbon atoms, hydrocarbyl phosphide groups having 1 to 60 carbon atoms, hydrocarbyl sulfide groups having 1 to 60 carbon atoms, a silyl group, and combinations thereof.

Examples of the neutral Lewis base-coordinating compound $X^3$ in the compound of the formula 8 include phosphines, ethers, amines, olefins having 2 to 40 carbon atoms, dienes having 1 to 40 carbon atoms, and divalent groups induced from these compounds.

In the present embodiment, the transition metal compound having a cyclic η-binding anionic ligand is preferably a transition metal compound represented by the formula 1 wherein j=1. Preferred examples of the compound represented by the formula 1 wherein j=1 include compounds represented by the following formula 9:

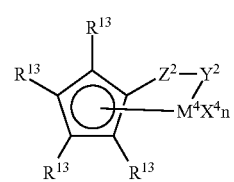

Formula 9

In the formula 9, $M^4$ represents a transition metal selected from the group consisting of titanium, zirconium, nickel, and hafnium, wherein the formal oxidation number of the transition metal is +2, +3, or +4. Each $R^{13}$ independently represents a hydrogen atom or a substituent having up to 20 non-hydrogen atoms, selected from the group consisting of hydrocarbon groups having 1 to 8 carbon atoms, a silyl group, a germyl group, a cyano group, halogen atoms, and combinations thereof provided that when the substituent $R^{13}$ is a hydrocarbon group having 1 to 8 carbon atoms, a silyl group, or a germyl group, two adjacent substituents $R^{13}$ are optionally bonded to each other to form a divalent group, which can form a ring in collaboration with the bond between two carbon atoms of the cyclopentadienyl ring bonded to these two adjacent substituents $R^{13}$, respectively.

In the formula 9, each $X^4$ independently represents a substituent having up to 20 non-hydrogen atoms, selected from the group consisting of halides, hydrocarbon groups having 1 to 20 carbon atoms, hydrocarbyloxy groups having 1 to 18 carbon atoms, hydrocarbylamino groups having 1 to 18 carbon atoms, a silyl group, hydrocarbylamide groups having 1 to 18 carbon atoms, hydrocarbyl phosphide groups having 1 to 18 carbon atoms, hydrocarbyl sulfide groups having 1 to 18 carbon atoms, and combinations thereof provided that two substituents $X^4$ can optionally form in collaboration a neutral conjugate diene having 4 to 30 carbon atoms or a divalent group.

In the formula 9, $Y^2$ represents —O—, —S—, —NR*—, or —PR*— wherein R* represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a combination thereof.

In the formula 9, $Z^2$ represents $SiR^*_2$, $CR^*_2$, $SiR^*_2SiR^*_2$, $CR^*_2CR^*_2$, $CR^*=CR^*$, $CR^*_2SiR^*_2$, or $GeR^*_2$ wherein R* is as defined above. n is 1, 2, or 3.

Examples of the transition metal compound having a cyclic η-binding anionic ligand used in the present embodiment include compounds as shown below. Specific examples of the zirconium compounds include, but are not particularly limited to, bis(methylcyclopentadienyl)zirconium dimethyl, bis(n-butylcyclopentadienyl)zirconium dimethyl, bis(indenyl)zirconium dimethyl, bis(1,3-dimethylcyclopentadienyl)zirconium dimethyl, (pentamethylcyclopentadienyl) (cyclopentadienyl)zirconium dimethyl, bis(cyclopentadienyl)zirconium dimethyl, bis(pentamethylcyclopentadienyl)zirconium dimethyl, bis(fluorenyl)zirconium dimethyl, ethylenebis(indenyl)zirconium dimethyl, ethylenebis(4,5,6,7-tetrahydro-1-indenyl) zirconium dimethyl, ethylenebis(4-methyl-1-indenyl) zirconium dimethyl, ethylenebis(5-methyl-1-indenyl) zirconium dimethyl, ethylenebis(6-methyl-1-indenyl) zirconium dimethyl, ethylenebis(7-methyl-1-indenyl) zirconium dimethyl, ethylenebis(5-methoxy-1-indenyl) zirconium dimethyl, ethylenebis(2,3-dimethyl-1-indenyl) zirconium dimethyl, ethylenebis(4,7-dimethyl-1-indenyl) zirconium dimethyl, ethylenebis-(4,7-dimethoxy-1-indenyl) zirconium dimethyl, methylenebis(cyclopentadienyl) zirconium dimethyl, isopropylidene(cyclopentadienyl) zirconium dimethyl, isopropylidene(cyclopentadienyl-fluorenyl)zirconium dimethyl, silylenebis(cyclopentadienyl) zirconium dimethyl, and dimethylsilylene (cyclopentadienyl)zirconium dimethyl.

Specific examples of the titanium compounds include, but are not particularly limited to, [(N-t-butylamido) (tetramethyl-$η^5$-cyclopentadienyl)-1,2-ethanediyl]titanium dimethyl, [(N-t-butylamido) (tetramethyl-$η^5$-cyclopentadienyl) dimethylsilane]titanium dimethyl, [(N-methylamido) (tetramethyl-$η^5$-cyclopentadienyl)dimethylsilane]titanium dimethyl, [(N-phenylamido) (tetramethyl-$η^5$-cyclopentadienyl)dimethylsilane]titanium dimethyl, [(N-benzylamido) (tetramethyl-$η^5$-cyclopentadienyl)dimethylsilane]titanium dimethyl, [(N-t-butylamido) ($η^5$-cyclopentadienyl)-1,2-ethanediyl]titanium dimethyl, [(N-t-butylamido) (is-cyclopentadienyl)dimethylsilane]titanium dimethyl, [(N-methylamido) ($η^5$-cyclopentadienyl)-1,2-ethanediyl]titanium dimethyl, [(N-methylamido) (is-cyclopentadienyl)dimethylsilane]titanium dimethyl, [(N-t-butylamido) ($η^5$-indenyl)dimethylsilane]titanium dimethyl, and [(N-benzylamido) ($η^5$-indenyl)dimethylsilane]titanium dimethyl.

Specific examples of the nickel compounds include, but are not particularly limited to, dibromobistriphenylphosphine nickel, dichlorobistriphenylphosphine nickel, dibromodiacetonitrile nickel, dibromodibenzonitrile nickel, dibromo(1,2-bisdiphenylphosphinoethane)nickel, dibromo (1,3-bisdiphenylphosphinopropane)nickel, dibromo(1,1'-diphenylbisphosphinoferrocene)nickel, dimethylbisdiphenylphosphine nickel, dimethyl(1,2-bisdiphenylphosphinoethane)nickel, methyl(1,2-bisdiphenylphosphinoethane)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane)palladium, bistriphenylphosphine palladium bistetrafluoroborate, and bis(2, 2'-bipyridine)methyl iron tetrafluoroborate etherate.

Specific examples of the hafnium compounds include, but are not particularly limited to, [(N-t-butylamido) (tetramethyl-η5-cyclopentadienyl)-1,2-ethanediyl]hafnium dimethyl, [(N-t-butylamido) (tetramethyl-η5-cyclopentadienyl) dimethylsilane]hafnium dimethyl, [(N-methylamido) (tetramethyl-η5-cyclopentadienyl)dimethylsilane]hafnium dimethyl, [(N-phenylamido) (tetramethyl-η5-cyclopentadienyl)dimethylsilane]hafnium dimethyl, [(N-benzylamido) (tetramethyl-η5-cyclopentadienyl)dimethylsilane]hafnium dimethyl, [(N-t-butylamido) (η5-cyclopentadienyl)-1,2-ethanediyl]hafnium dimethyl, [(N-t-butylamido) (is-cyclopentadienyl)dimethylsilane]hafnium dimethyl, [(N-methylamido) (η5-cyclopentadienyl)-1,2-ethanediyl]hafnium dimethyl, [(N-methylamido) (is-cyclopentadienyl)dimethylsilane]hafnium dimethyl, [(N-t-butylamido) (η5-indenyl)dimethylsilane]hafnium dimethyl, and [(N-benzylamido) (η5-indenyl)dimethylsilane]hafnium dimethyl.

Specific examples of the transition metal compound having a cyclic η-binding anionic ligand used in the present embodiment further include compounds named by the replacement of the moiety "dimethyl" (which appears at the end of the name of each compound, i.e., immediately after the moiety "zirconium" or "titanium", and corresponds to the moiety of $X^4$ in the formula (2)) in the name of each zirconium compound or titanium compound listed above with, for example, any of "dichloro", "dibromo", "diiodo", "diethyl", "dibutyl", "diphenyl", "dibenzyl", "2-(N,N-dimethylamino)benzyl", "2-butene-1,4-diyl", "s-trans-$η^4$-1,4-diphenyl-1,3-butadiene", "s-trans-$η^4$-3-methyl-1,3-pentadiene", "s-trans-$η^4$-1,4-dibenzyl-1,3-butadiene", "s-trans-$η^4$-2,4-hexadiene", "s-trans-$η^4$-1,3-pentadiene", "s-trans-$η^5$-1, 4-ditolyl-1,3-butadiene", "s-trans-$η^5$-1,4-bis (trimethylsilyl)-1,3-butadiene", "s-cis-$η^4$-1,4-diphenyl-1,3-butadiene", "s-cis-$η^4$-3-methyl-1,3-pentadiene", "s-cis-$η^4$-1,4-dibenzyl-1,3-butadiene", "s-cis-$η^4$-2,4-hexadiene", "s-cis-$η^4$-1,3-pentadiene", "s-cis-$η^5$-1,4-ditolyl-1,3-butadiene", and "s-cis-$η^4$-1,4-bis(trimethylsilyl)-1,3-butadiene".

The transition metal compound having a cyclic η-binding anionic ligand used in the present embodiment can be synthesized by a method generally known in the art. In the present embodiment, these transition metal compounds may be used singly or in combination.

Next, the activating agent b) capable of forming a complex that exerts catalytic activity through reaction with the transition metal compound (hereinafter, also simply referred to as an "activating agent") used in the present embodiment will be described.

Examples of the activating agent for use in the present embodiment include compounds represented by the following formula 10:

$$[L^2\text{-}H]^{d+}[M^5{}_mQ_p]^{d-} \quad \text{Formula 10}$$

wherein $[L^2\text{-}H]^{d+}$ represents a proton-donating Bronsted acid wherein $L^2$ represents a neutral Lewis base, and d represents an integer of 1 to 7; and $[M^5{}_mQ_p]^{d-}$ represents a compatible non-coordinating anion wherein $M^5$ represents a metal belonging to any of groups 5 to 15 of the periodic system, or a metalloid, each Q is independently selected from the group consisting of hydrides, halides, dihydrocarbylamide groups having 2 to 20 carbon atoms, hydrocarbyloxy groups having 1 to 30 carbon atoms, hydrocarbon groups having 1 to 30 carbon atoms, and substituted hydrocarbon groups having 1 to 40 carbon atoms wherein the number of the halide represented by Q is 1 or less, m represents an integer of 1 to 7, p represents an integer of 2 to 14, and d is as defined above provided that p−m=d.

Specific examples of the non-coordinating anion include, but are not particularly limited to, tetrakisphenyl borate, tri(p-tolyl)(phenyl) borate, tris(pentafluorophenyl)(phenyl) borate, tris(2,4-dimethylphenyl)(phenyl) borate, tris(3,5-dimethylphenyl)(phenyl) borate, tris(3,5-di-trifluoromethylphenyl)(phenyl) borate, tris(pentafluorophenyl)(cyclohexyl) borate, tris(pentafluorophenyl)(naphthyl) borate, tetrakis(pentafluorophenyl) borate, triphenyl(hydroxyphenyl) borate, diphenyl-di(hydroxyphenyl) borate, triphenyl(2,4-dihydroxyphenyl) borate, tri(p-tolyl)(hydroxyphenyl) borate, tris(pentafluorophenyl)(hydroxyphenyl) borate, tris(2,4-dimethylphenyl)(hydroxyphenyl) borate, tris(3,5-dimethylphenyl)(hydroxyphenyl) borate, tris(3,5-di-trifluoromethylphenyl)(hydroxyphenyl) borate, tris(pentafluorophenyl)(2-hydroxyethyl) borate, tris(pentafluorophenyl)(4-hydroxybutyl) borate, tris(pentafluorophenyl)(4-hydroxy-cyclohexyl) borate, tris(pentafluorophenyl)(4-(4'-hydroxyphenyl)phenyl) borate, and tris(pentafluorophenyl)(6-hydroxy-2-naphthyl) borate.

Other preferred examples of the non-coordinating anion include borates derived from the borates listed above by the replacement of the hydroxy group with a NHR group wherein R is preferably a methyl group, an ethyl group, or a tert-butyl group.

Specific examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, and tri(n-octyl)ammonium; N,N-dialkylanilinium cations such as N,N-dimethylanilinium, N,N-diethylanilinium, N,N-2,4,6-pentamethylanilinium, and N,N-dimethylbenzylanilinium; dialkylammonium cations such as di-(i-propyl)ammonium and dicyclohexylammonium; triarylphosphonium cations such as triphenylphosphonium, tri(methylphenyl)phosphonium, and tri(dimethylphenyl)phosphonium; and dimethylsulfonium, diethylsulfonium, and diphenylsulfonium.

In the present embodiment, an organic metal oxy compound having unit represented by the following formula 11 may be used as the activating agent:

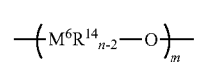

Formula 11 wherein $M^6$ represents a metal belonging to any of groups 13 to 15 of the periodic system, or a metalloid, each $R^{14}$ independently represents a hydrocarbon group having 1 to 12 carbon atoms or a substituted hydrocarbon group, n represents the valence of the metal $M^6$, and m represents an integer of 2 or larger.

As a preferred example, the activating agent for use in the present embodiment is, for example, an organic aluminum oxy compound comprising a unit represented by the following formula 12:

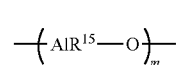

Formula 12 wherein $R^{15}$ represents an alkyl group having 1 to 8 carbon atoms, and m represents an integer of 2 to 60.

As a more preferred example, the activating agent for use in the present embodiment is, for example, a methylalumoxane comprising a unit represented by the following formula 13:

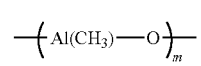

Formula 13 wherein m represents an integer of 2 to 60.

In the present embodiment, these activating agent components may be used singly or in combination.

In the present embodiment, such a catalytic component may be used as a supported catalyst in which the component is supported by a solid component. Such a solid component is not particularly limited and is specifically, for example, at least one inorganic solid material selected from: porous polymer materials such as polyethylene, polypropylene, and styrene-divinylbenzene copolymers; inorganic solid materials having an element belonging to any of groups 2, 3, 4, 13, and 14 of the periodic system, such as silica, alumina, magnesia, magnesium chloride, zirconia, titania, boron oxide, calcium oxide, zinc oxide, barium oxide, vanadium pentaoxide, chromium oxide, and thorium oxide, and mixtures thereof; and complex oxides thereof.

Specific examples of the complex oxides of silica include, but are not particularly limited to, complex oxides of silica and an element of group 2 or 13 of the periodic system, such as silica-magnesia and silica-alumina. In the present embodiment, in addition to the two catalytic components mentioned above, an organic aluminum compound can be used, if necessary, as a catalytic component. The organic aluminum compound that can be used in the present embodiment is, for example, a compound represented by the following formula 14:

$$AlR^{16}{}_nX^5{}_{3-n} \quad \text{Formula 14}$$

wherein $R^{16}$ represents an alkyl group having 1 to 12 carbon atoms or an aryl group having 6 to 20 carbon atoms, $X^5$ represents halogen, hydrogen, or an alkoxyl group, wherein the alkyl group is linear, branched, or cyclic, and n represents an integer of 1 to 3.

In this context, the organic aluminum compound may be a mixture of compounds represented by the formula 14. In the organic aluminum compound that can be used in the present embodiment, examples of $R^{16}$ in the formula include a methyl group, an ethyl group, a butyl group, an isobutyl group, a hexyl group, an octyl group, a decyl group, a phenyl group, and a tolyl group. Examples of $X^5$ in the formula include a methoxy group, an ethoxy group, a butoxy group, and chloro.

Specific examples of the organic aluminum compound that can be used in the present embodiment include, but are not particularly limited to, trimethyl aluminum, triethyl aluminum, tributyl aluminum, triisobutyl aluminum, trihexyl aluminum, trioctyl aluminum, and tridecyl aluminum. Alternative examples of the organic aluminum compound that can be used in the present embodiment include reaction products of these organic aluminums and alcohols such as methyl alcohol, ethyl alcohol, butyl alcohol, pentyl alcohol, hexyl alcohol, octyl alcohol, and decyl alcohol, for example, dimethyl methoxy aluminum, dimethyl ethoxy aluminum, and dibutyl butoxy aluminum.

Examples of the polymerization method for the polyethylene in the method for producing the ultrahigh-molecular-weight polyethylene powder of the present embodiment include methods for (co)polymerizing ethylene or monomers including ethylene by a suspension polymerization or vapor-phase polymerization method. Among them, the suspension polymerization method is preferred because this method can efficiently remove polymerization heat. In the suspension polymerization method, an inert hydrocarbon vehicle can be used as a vehicle. The olefin itself can also be used as a solvent.

Specific examples of such an inert hydrocarbon vehicle can include, but are not particularly limited to: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

(Polymerization Conditions)

In the method for producing the ultrahigh-molecular-weight polyethylene powder of the present embodiment, the polymerization temperature is usually 30° C. or higher and 100° C. or lower. The polymerization temperature equal to or higher than 30° C. tends to realize efficient industrial production. On the other hand, the polymerization temperature equal to or lower than 100° C. tends to realize continuous stable operation.

In the method for producing the ultrahigh-molecular-weight polyethylene powder of the present embodiment, the polymerization pressure is usually atmospheric pressure or higher and 2 MPa or lower. The polymerization pressure is preferably 0.1 MPa or higher, more preferably 0.12 MPa or higher and preferably 1.5 MPa or lower, more preferably 1.0 MPa or lower. The polymerization pressure equal to or higher than atmospheric pressure tends to realize efficient industrial production. The polymerization pressure equal to or lower than 2 MPa tends to be able to suppress partial heat generation ascribable to rapid polymerization reaction during the introduction of a catalyst, and realize stable production of the polyethylene.

The polymerization reaction can be carried out by any of batch, semicontinuous, and continuous methods. Continuous polymerization is preferred. A partial high-temperature state ascribable to rapid ethylene reaction can be suppressed by continuously supplying ethylene gas, a solvent, a catalyst, etc., into the polymerization system while continuously discharging them together with produced polyethylene. Thus, the polymerization system is further stabilized. Ethylene reaction in a homogeneous state in the system prevents the formation of branches and/or double bonds or the like in polymer chains and is less likely to cause reduction in molecular weight and/or cross-linking of the polyethylene. The resulting ultrahigh-molecular-weight polyethylene powder decreases unmelted matter remaining when melted or dissolved, is prevented from being colored, and is less likely to present problems such as reduced mechanical properties. Accordingly, the continuous method, which achieves a more homogeneous polymerization system, is preferred.

Alternatively, the polymerization may be carried out at two or more stages differing in reaction conditions. The intrinsic viscosity of the resulting polyethylene can also be adjusted by the presence of hydrogen in the polymerization system or by the change of the polymerization temperature, as described in, for example, the specification of West German Patent Application Publication No. 3127133. The addition of hydrogen as a chain transfer agent into the polymerization system can control the intrinsic viscosity within a proper range. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less. In the present embodiment, in addition to each component as mentioned above, other components known in the art to be useful in production of the polyethylene can be included.

For the polymerization for the ultrahigh-molecular-weight polyethylene powder of the present embodiment, an antistatic agent such as Stadis 450 manufactured by The Associated Octel Company Ltd. (agent: Maruwa Bussan K. K.) may be used for suppressing the adherence of polymers to a polymerization reactor. Stadis 450 may be diluted with an inert hydrocarbon vehicle and then added to the polymerization reactor through a pump or the like. The amount of this dilution added is preferably in the range of 0.10 ppm or higher and 20 ppm or lower, more preferably in the range of 0.20 ppm or higher and 10 ppm or lower, based on the amount of the polyethylene produced per unit time.

In the method for producing the ultrahigh-molecular-weight polyethylene powder of the present embodiment, the temperature of the catalyst to be charged into a reactor is preferably adjusted to a "temperature of polymerization temperature+10° C. or higher".

In the polymerization step, baffle plates are preferably disposed at 2 or more and 6 or less equally spaced locations in the reactor. The baffle plates are preferably disposed from the bottom of the reactor to the top (opening) of the reactor. Preferably, the length from the top of projections of the baffle plates to the side of the reactor is adjusted to 10% or more and 30% or less of the inside diameter of the reactor, and the projection width is adjusted to 10% or more and 30% or less of the circumferential length of the reactor.

In the step of drying the ultrahigh-molecular-weight polyethylene powder, the drying temperature is preferably changed between a pre-stage (first half of the total drying time) and a post-stage (latter half of the total drying time) (pre-stage: 60° C. or higher and lower than 70° C., post-stage: 70° C. or higher and 90° C. or lower). Such a drying step rather than rapid drying at a high temperature can prevent the ultrahigh-molecular-weight polyethylene powder from being broken to increase the amount of a fine powder.

In this way, each polymerization condition can be adjusted to obtain the ultrahigh-molecular-weight polyethylene powder of the present embodiment.

[Additive]

The ultrahigh-molecular-weight polyethylene powder of the present embodiment can be supplemented, if necessary, with an additive such as a slip agent, a neutralizer, an antioxidant, a light stabilizer, an antistatic agent, or a pigment.

Examples of the slip agent or the neutralizer include, but are not particularly limited to, aliphatic hydrocarbons, higher fatty acids, higher fatty acid metal salts, fatty acid esters of alcohols, waxes, higher fatty acid amides, silicone oil, and rosin. The content of the slip agent or the neutralizer is not particularly limited and is 5000 ppm or lower, preferably 4000 ppm or lower, more preferably 3000 ppm or lower.

The antioxidant is not particularly limited and is preferably, for example, a phenol compound or a phenol-phosphorus compound, specifically include: phenol antioxidants such as 2,6-di-t-butyl-4-methylphenol(dibutylhydroxytoluene), n-octadecyl-3-(4-hydroxy-3,5-di-t-butylphenyl)propionate, and tetrakis(methylene (3,5-di-t-butyl-4-hydroxyhydrocinnamate))methane; phenol-phosphorus antioxidants such as 6-[3-(3-t-butyl-4-hydroxy-5-methylphenyl) propoxy]-2,4,8,10-tetra-t-butyldibenzo[d,f][1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis (2,4-t-butylphenyl phosphite).

In the ultrahigh-molecular-weight polyethylene powder according to the present embodiment, the amount of the antioxidant is preferably 5 parts by mass or lower, more preferably 4 parts by mass or lower, further preferably 3 parts by mass or lower, particularly preferably 2 parts by mass or lower, per 100 parts by mass in total of the ultrahigh-molecular-weight polyethylene powder and the liquid paraffin. The ultrahigh-molecular-weight polyethylene powder containing 5 parts by mass or lower of the antioxidant is less susceptible to embrittlement and/or discoloration, reduction in mechanical properties, etc., because of the suppressed degradation thereof, resulting in better long-term stability.

Examples of the light stabilizer include, but are not particularly limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light stabilizer is not particularly limited and is 5000 ppm or lower, preferably 3000 ppm or lower, more preferably 2000 ppm or lower.

Examples of the antistatic agent include, but are not particularly limited to, aluminosilicate, kaolin, clay, natural silica, synthetic silica, silicates, talc, diatomaceous earth, and glycerin fatty acid ester.

[Molded Article]

The ultrahigh-molecular-weight polyethylene powder of the present embodiment can be processed by various methods. A molded article obtained using the polyethylene powder can be employed in various uses. The molded article is not limited and is suitable for, for example, a microporous membrane for secondary battery separators, particularly, a microporous membrane for lithium ion secondary battery separators, a sintered body, or a high-strength fiber. Examples of the method for producing the microporous membrane include a processing method based on a wet process using a solvent, which involves extrusion in an extruder equipped with a T die, drawing, extraction, and drying.

The molded article can also be used as a molded article obtained by sintering the ethylene polymer by exploiting excellent features such as abrasion resistance, high slidability, high strength, and high impact resistance, which are the properties of the high-molecular-weight ethylene polymer.

Examples of the method for producing the high-strength fiber include a method which involves kneading and spinning liquid paraffin and the ultrahigh-molecular-weight polyethylene powder, followed by heating and drawing to obtain the high-strength fiber.

EXAMPLES

Hereinafter, the present invention will be described more specifically with reference to Examples and Comparative Examples. However, the present invention is not intended to be limited by Examples below by any means.

[Methods and Conditions for Measuring]

The physical properties of ultrahigh-molecular-weight polyethylene powders of Examples and Comparative Examples were measured by the following methods.

(1) Viscosity-Average Molecular Weight (Mv and Mv(A))

[Kneading Conditions 1]

The calculation of the rate of decomposition in Examples and Comparative Examples was performed by obtaining a kneaded gel by the following method. Liquid paraffin, each ultrahigh-molecular-weight polyethylene powder, and an antioxidant were kneaded at composition of 95 parts by mass, 5 parts by mass, and 1 part by mass, respectively, per 100 parts by mass in total of the liquid paraffin and the ultrahigh-molecular-weight polyethylene powder. Specifically, 2.0 g of the ultrahigh-molecular-weight polyethylene powder, 38.0 g of liquid paraffin (product name: Smoil P-350P) manufactured by MORESCO Corp., and 0.4 g of tetrakis[methylene(3,5-di-t-butyl-4-hydroxy-hydrocinnamate)]methane (product name: ANOX20) manufactured by Great Lakes Chemical Japan were added to a 200 ml poly-cup and well mixed. Then, Labo Plastomill Mixer (unit model: 30C150, mixer model: R-60) manufactured by Toyo Seiki Seisaku-sho, Ltd. was charged therewith, and the mixture was kneaded at 130° C. for 30 minutes, subsequently kneaded under heating to 240° C. at a rate of 22° C./min, and further kneaded at 240° C. for 15 minutes. The kneading is performed in the nitrogen atmosphere, and the number of rotations was 50 rpm for all the procedures. Then, the liquid paraffin was extracted from the obtained kneaded gel using hexane, and the residue was dried in vacuum for 24 hours or longer to obtain a kneaded product.

The viscosity-average molecular weight Mv of each ultrahigh-molecular-weight polyethylene powder obtained in Examples and Comparative Examples was determined by the following method in accordance with ISO1628-3 (2010).

First, 20 mg of the ultrahigh-molecular-weight polyethylene powder was weighed into a dissolution tube. After purging with the dissolution tube with nitrogen, 20 mL of decahydronaphthalene (supplemented with 1 g/L of 2,6-dit-butyl-4-methylphenol) was added thereto. The ultrahigh-molecular-weight polyethylene powder was dissolved by stirring at 150° C. for 2 hours. The falling time (ts) between gauges of the solution was measured in a thermostat bath of 135° C. using a Cannon-Fenske viscometer (manufactured by Sibata Scientific Technology Ltd.; product No. 100). The falling time (ts) between gauges of a sample containing the ultrahigh-molecular-weight polyethylene powder in an amount changed to 10 mg, 5 mg, or 2 mg was measured in the same way as above. The falling time (tb) of decahydronaphthalene alone was measured as a blank without the addition of the ultrahigh-molecular-weight polyethylene powder. The reduced viscosity (ηsp/C) of the ultrahigh-molecular-weight polyethylene powder was determined according to the following expression.

$$\eta sp/C = (ts/tb - 1)/0.1 \text{(unit: dL/g)}$$

The relationship between the concentration (C) (unit: g/dL) and the reduced viscosity (ηsp/C) of each ultrahigh-molecular-weight polyethylene powder was plotted, and a linear approximation formula was obtained by the least square method. The intrinsic viscosity ([η]) was determined by extrapolation to the concentration 0. Next, the viscosity-average molecular weight (Mv) was calculated from the value of the intrinsic viscosity ([η]) according to the following mathematical expression A.

$$Mv = (5.34 \times 10^4) \times [\eta]^{1.49} \quad \text{(Mathematical expression A)}$$

The viscosity-average molecular weight Mv(A) of a kneaded product obtained under kneading conditions 1 was also calculated in the same way as in the viscosity-average molecular weight Mv of the ultrahigh-molecular-weight polyethylene powder.

The rate of decomposition was determined from the calculated viscosity-average molecular weights Mv and Mv(A) according to the following expression.

$$\text{Rate of decomposition} = \{Mv - Mv(A)\}/Mv$$

(2) Average Pore Size and Average Pore Volume of Ultrahigh-Molecular-Weight Polyethylene Powder Having Particle Size of 212 μm or Larger Each ultrahigh-molecular-weight polyethylene powder was classified through screen meshes having an aperture size of 710 μm, 500 μm, 425 μm, 355 μm, 300 μm, 212 μm, 150 μm, 106 μm, 75 μm, or 53 μm conforming to the specification of JIS Z 8801.

A powder having a particle size of 212 μm or larger was separated from these fractions of the classified ultrahigh-molecular-weight polyethylene powder. If necessary, the powder was sifted through a 1.0 mm sieve.

The average pore volume and pore distribution of the powder were measured using AutoPore IV9500 manufactured by Shimadzu Corp. as a mercury porosimeter. The average pore size was calculated on the basis of the obtained pore distribution.

For pretreatment, 0.5 g of the powder was placed in a sample cell and deaerated and dried at ordinary temperature in a low-pressure measuring section. Then, the sample container was filled with mercury. Pressure was gradually applied thereto (high-pressure section) so that mercury was injected into the pores of the sample.

The pressure conditions were set as follows.

Low-temperature section: Measurement at $N_2$ pressure of 69 Pa (0.01 psia)

High-temperature section: 21 to 228 MPa (3000 to 33000 psia)

[Average Particle Size (D50)]

The average particle size of each ultrahigh-molecular-weight polyethylene powder was defined as a particle size that reached 50% by weight in an integral curve in which the weights of particles remaining on respective sieves in the classification of 100 g of particles using 10 types of sieves (aperture size: 710 μm, 500 μm, 425 μm, 355 μm, 300 μm, 212 μm, 150 μm, 106 μm, 75 μm, and 53 μm) stipulated by JIS Z 8801 were integrated from the larger aperture size.

(3) Content of Particle Having Particle Size of 53 μm or Smaller

The content of a particle having a particle size of 53 μm or smaller in each ultrahigh-molecular-weight polyethylene powder was determined as the weight of particles passing through a sieve having an aperture size of 53 μm based on the total weight of particles (ultrahigh-molecular-weight polyethylene powder) after classification of 100 g of the particles using 10 types of sieves (aperture size: 710 μm, 500 μm, 425 μm, 355 μm, 300 μm, 212 μm, 150 μm, 106 μm, 75 μm, and 53 μm) stipulated by JIS Z 8801.

The % content (%) of the particle having a particle size of 53 μm or smaller was calculated according to the following expression from the thus-determined weight of particles passing through a sieve having an aperture size of 53 μm.

% content (%) of the particle having a particle size of 53 μm or smaller=[Weight (g) of particles passing through a sieve having an aperture size of 53 μm]/[Total weight 100 (g) of particles (ultrahigh-molecular-weight polyethylene powder)]×100

In this measurement, the ultrahigh-molecular-weight polyethylene powder was used before being sifted through a "sieve having an aperture size of 425 μm" described in Examples and Comparative Examples mentioned later.

(4) Bulk Density of Ultrahigh-Molecular-Weight Polyethylene Powder Having Particle Size of 212 μm or Larger i) Each ultrahigh-molecular-weight polyethylene powder was classified through screen meshes having an aperture size of 710 μm, 500 μm, 425 μm, 355 μm, 300 μm, 212 μm, 150 μm, 106 μm, 75 μm, or 53 μm conforming to the specification of JIS Z 8801.

ii) A powder having a particle size of 212 μm or larger was separated from these fractions of the classified ultrahigh-molecular-weight polyethylene powder.

iii) If necessary, the powder was sifted through a 1.0 mm sieve.

iv) The powder was travelled down to a 100 cc cylindrical container until overflowing via a calibrated orifice of a funnel having a standard dimension according to JIS K 6891.

v) In order to prevent consolidation and/or the overflow of the powder from the cup, the blade of a spatula or the like was smoothly moved in a vertical fashion in contact with the upper face of the container to carefully scrape off an excess of powder from the upper face of the container.

vi) The sample was wholly removed also from the side of the container, and the mass of the powder together with the container was measured. The mass of the vacant container for measurement measured in advance was subtracted therefrom to calculate the mass (m) of the powder up to 0.1 g.

vii) The bulk density (g/cc) was calculated according to the following expression.

Bulk density (g/cc)=Mass (m) of the powder/Volume (cc) of the cylindrical container viii) The measurement described above was performed three times, and the average value thereof was recorded.

In this measurement, the ultrahigh-molecular-weight polyethylene powder was used before being sifted through a "sieve having an aperture size of 425 μm" described in Examples and Comparative Examples mentioned later.

(5) Mg, Ti, Al, Si, and Cl Contents in Ultrahigh-Molecular-Weight Polyethylene Powder Each ultrahigh-molecular-weight polyethylene powder was pressure-decomposed using a microwave decomposition apparatus (model ETHOS TC, manufactured by Milestone General K. K.). The element concentrations of the metals Mg, Ti, Al, Si, and Cl in the ultrahigh-molecular-weight polyethylene powder were measured by the internal standard method using ICP-MS (inductively coupled plasma-mass spectrometer, model X Series X7, manufactured by ThermoFisher Scientific K. K.). Mg, Ti, Al, Si, and Cl contents in a molded article such as a membrane or a thread may be measured by the measurement described above after cutout of the molded article.

In the present application, ethylene and hexane used in Examples and Comparative Examples were dehydrated using MS-3A (manufactured by UNION SHOWA K. K.). The hexane was used after being further deoxidated by deaeration under reduced pressure using a vacuum pump.

[Evaluation Method]

(6) Method for Producing High-Strength Fiber Using Ultrahigh-Molecular-Weight Polyethylene Powder The method for producing a high-strength fiber using the ultrahigh-molecular-weight polyethylene powder of the present embodiment will be described below.

5 parts by mass of each ultrahigh-molecular-weight polyethylene powder, 95 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin to prepare a liquid in a slurry form.

Next, the liquid in the slurry form was vacuum-deaerated with stirring at 80° C. or higher for 1 hour or longer and then introduced into an extruder. The liquid in the slurry form in the extruder was kneaded in the nitrogen atmosphere, and the oxygen concentration was set to 0.1% or lower.

A twin screw extruder (unit model: 2D25S) for Labo Plastomill (unit model: 30C150) manufactured by Toyo Seiki Seisaku-sho, Ltd. was used as the extruder into which the liquid in the slurry form was introduced. Kneading and spinning operation was performed.

The temperature at which the liquid in the slurry form was formed in the extruder was 140° C. or higher and 320° C. or lower. The melt retention time within the extruder was 5 minutes or longer and 30 minutes or shorter.

Then, the liquid was spun through a spinneret attached to the tip of the extruder. The temperature of the spinneret was 140° C. or higher and 250° C. or lower. The discharge rate was 0.5 g/min or more and 2.0 g/min or less. The pore size of the spinneret was 0.3 mm or larger and 1.5 mm or smaller.

Next, the discharged thread containing the liquid paraffin was charged into a water bath of 5° C. or higher and 15° C. or lower via an air gap of 3 to 5 cm and wound while rapidly cooled. The winding rate was 20 m/min or more and 50 m/min or less.

Subsequently, the liquid paraffin was removed from the thread. The thread was dipped in a solvent such as hexane, followed by extraction operation and subsequent drying in vacuum for 24 hours or longer.

The obtained thread was brought into contact with a metal heater such that the temperature of the thread reached 100° C. or higher and 140° C. or lower. The thread was primarily drawn, and the drawn thread was wound. Subsequently, the drawn thread was brought into contact with a metal heater such that the temperature of the drawn thread reached 140° C. or higher and 160° C. or lower. The thread was further secondarily drawn. The thread was drawn immediately before being broken to obtain a drawn thread. The obtained drawn thread (high-strength fiber) was evaluated for the uniformity of its thread diameter as follows.

[Thread Diameter Evaluation]

Ten threads obtained by spinning and drawn to the breaking limit were provided according to the method described in (6), and an average thread diameter was calculated at n=10. The average thread diameter was 10 μm or larger and 20 μm or smaller.

(Evaluation Criteria)

⊚ represents being very good and means variations of less than ±5 μm from the average thread diameter.

○ represents having no problem and means variations of ±5 μm or more and less than ±10 μm from the average thread diameter.

x represents being poor and means variations of ±10 μm or more from the average thread diameter.

[Breaking Strength and Degree of Orientation of Thread]

Ten threads obtained by spinning were provided according to the method described in (6), and the breaking strength and degree of orientation of the threads were calculated at n=10. The methods for calculating the breaking strength and degree of orientation of the threads were as described below.

[Measurement of Breaking Strength of Thread]

The strength of each ultrahigh-molecular-weight polyethylene fiber in Examples and Comparative Examples was breaking strength and was calculated by pulling the thread drawn to the breaking limit, at room temperature until break, and dividing the highest load value thus applied to the thread by fineness. The fineness is a weight per $1 \times 10^4$ m of the thread, and its unit is dtex.

[Measurement of Degree of Orientation of Thread]

The degree of orientation of each ultrahigh-molecular-weight polyethylene fiber in Examples and Comparative Examples was calculated by installing a Berek compensator (unit model: U-CBE) manufactured by Olympus Corp. in an optical system microscope (unit model: BX51TRF-6(D)) manufactured by Olympus Corp., calculating a retardation value (Re), and using the expression given below. The fiber for use in the measurement consisted of five single yarns. Three points of the degree of orientation (also referred to as retardation) were measured at different locations per single yarn, and the average value thereof was calculated to determine a retardation value.

$$Re = \Delta n0 \times P \times d$$

Re: retardation value

Δn0: intrinsic birefringence of the molecule (PE: 0.066)

P: degree of orientation d: sample thickness (thread diameter for the fiber)

(Evaluation Criteria for Breaking Strength of Thread)

⊚ (good) . . . breaking strength of 30 cN/dtex or more

○ (fair) . . . breaking strength of 20 cN/dtex or more and less than 30 cN/dtex x (poor) . . . breaking strength of less than 20 cN/dtex
(Evaluation Criteria for Degree of Orientation of Thread)
⊚ (good) . . . a degree of orientation of 0.70 or more
◯ (fair) . . . a degree of orientation of 0.40 or more and less than 0.70
x (poor) . . . a degree of orientation of less than 0.40
[Evaluation of Amount of Gum]
Spinning operation was performed for 1 hour according to the method described in (6). In this operation, the amount of gum attached near a spinneret was visually determined.
(Evaluation Criteria)
⊚ (good) . . . gum was absent.
◯ (fair) . . . gum was present (in a small amount).
x (poor) . . . gum was present (in a large amount).
[Evaluation of Amount of Lamp Black]
Spinning operation was performed for 1 hour according to the method described in (6). In this operation, the amount of lamp black was visually determined.
(Evaluation Criteria)
⊚ (good) . . . lamp black was absent.
◯ (fair) . . . lamp black was present (in a small amount).
x (poor) . . . lamp black was present (in a large amount).
(7) Method for Producing Microporous Membrane for Secondary Battery Separator Using Ultrahigh-Molecular-Weight Polyethylene Powder 30 to 40 parts by mass of each ultrahigh-molecular-weight polyethylene powder, 60 to 70 parts by mass of liquid paraffin (liquid paraffin (product name: Smoil P-350P) manufactured by MORESCO Corp.), and 1 part by mass of an antioxidant (tetrakis[methylene (3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin to prepare a liquid in a slurry form.

The obtained liquid in the slurry form was charged via a feeder into a twin screw extruder (unit model: 2D25S) for Labo Plastomill (unit model: 30C150) manufactured by Toyo Seiki Seisaku-sho, Ltd. in the nitrogen atmosphere after purging with nitrogen. The liquid was kneaded under conditions of 200° C. and then extruded from a T die placed at the tip of the extruder. Immediately thereafter, the extrudate was solidified by cooling on a cast roll cooled to 25° C. to form a sheet in a gel form.

This sheet in the gel form was drawn at 120° C. at a ratio of 7×7 using a simultaneous biaxial drawing machine. Then, this drawn film was dipped in methyl ethyl ketone or hexane for the extraction and removal of liquid paraffin, and then vacuum-dried for 24 hours or longer. The film was further heat-set at 125° C. for 3 minutes to obtain a microporous membrane.
[Film Thickness Evaluation]
A membrane was formed according to the method described in (7). The film thickness was measured at room temperature (23° C.) using a micro thickness gauge (Type KBM®) manufactured by Toyo Seiki Seisaku-sho, Ltd. Ten arbitrary points were selected for measurement such that the points were evenly positioned per m of the membrane. A total of 50 points in 5 m of the membrane were measured, and an average film thickness was calculated. The average film thickness was 5 μm or larger and 20 μm or smaller.
(Evaluation Criteria)
⊚ represents being very good and means variations of less than ±3 μm from the average film thickness.
◯ represents having no problem and means variations of ±3 μm or more and less than ±5 μm from the average film thickness.
x represents being poor and means variations of ±5 μm or more from the average film thickness.
[Rate of Shrinkage of Membrane]
A sheet in a gel form obtained according to the method described in (7) was drawn at 120° C. at a ratio of 7×7 using a simultaneous biaxial drawing machine. This sheet in the gel form had an 80 mm×80 mm square shape. Small holes were opened at four corners using an injection needle. The distances between the holes were compared between before and after the drawing to calculate the rate of shrinkage of the membrane after the drawing. Evaluation was conducted at n=10, and the average value thereof was calculated as the rate of shrinkage of the membrane.
(Evaluation Criteria)
⊚ (good) . . . the rate of shrinkage of the membrane was less than 15%.
◯ (fair) . . . the rate of shrinkage of the membrane was 15% or more and less than 25%.
x (poor) . . . the rate of shrinkage of the membrane was 25% or more.
[Puncture Strength of Membrane]
A sheet in a gel form obtained according to the method described in (7) was drawn at 120° C. at a ratio of 7×7 using a simultaneous biaxial drawing machine. The drawn membrane was subjected to a puncture test under conditions involving a radius of curvature of 0.5 mm at the tip of a needle and a puncture rate of 2 mm/sec using "KES-G5 Handy Compression Tester" (TM) manufactured by Kato Tech Co., Ltd. to measure a maximum puncture load (N). The puncture strength of the membrane was evaluated on the basis of the measured maximum puncture load (N). A maximum puncture load (N) of 3.5 N or more represents sufficiently excellent strength. The evaluation criteria are as follows.
(Evaluation Criteria)
⊚ (good): a maximum puncture load of 3.5 N or more
◯ (fair): a maximum puncture load of 3.0 N or more and less than 3.5 N
x (poor): a maximum puncture load of less than 3.0 N
[Evaluation of Amount of Gum]
Film formation operation was performed for 1 hour according to the method described in (7). In this operation, the amount of gum attached to the tip of an extruder was visually determined.
(Evaluation Criteria)
⊚ (good) . . . gum was absent.
◯ (fair) . . . gum was present (in a small amount).
x (poor) . . . gum was present (in a large amount).
[Evaluation of Amount of Lamp Black]
Film formation operation was performed for 1 hour according to the method described in (7). In this operation, the amount of lamp black was visually determined.
(Evaluation Criteria)
⊚ (good) . . . lamp black was absent.
◯ (fair) . . . lamp black was present (in a small amount).
x (poor) . . . lamp black was present (in a large amount).

Method for Synthesizing Catalyst

[Reference Example 1: Catalyst Synthesis Example 1: Preparation of Solid Catalytic Component [A]]

To an 8 L stainless autoclave purged with nitrogen, 1,600 mL of hexane was added. To this autoclave, 800 mL of a hexane solution containing 1 mol/L titanium tetrachloride and 800 mL of a hexane solution containing 1 mol/L organic magnesium compound represented by the compositional formula $AlMg_5(C_4H_9)_{11}(OSiH)_2$ were added at the same time over 6 hours with stirring at 15° C. After the addition, the mixture was gradually heated, and the reaction was continued at 15° C. for 1.5 hour. After the completion of the reaction, 1,600 mL of the supernatant was removed, and the resulting solid was washed with 1,600 mL of hexane ten times to prepare solid catalytic component [A]. The amount of titanium contained per g of this solid catalytic component was 3.31 mmol.

[Reference Example 2: Catalyst Synthesis Example 2: Preparation of Supported Metallocene Catalytic Component [B]]

Spherical silica having an average particle size of 15 μm, a surface area of 700 $m^2/g$, and an intra-particle pore volume of 1.6 mL/g was fired at 500° C. for 7 hours in the nitrogen atmosphere for dehydration. The amount of surface hydroxy groups on the dehydrated silica was 1.82 mmol/g per $SiO_2$. In a 1.8 L autoclave, 40 g of this dehydrated silica was dispersed in 800 mL of hexane in the nitrogen atmosphere to obtain slurry. While the temperature of the obtained slurry was kept at 60° C. with stirring, 80 mL of a hexane solution of triethyl aluminum (concentration: 1 mol/L) was added thereto. Then, the mixture was stirred for 3 hours such that the triethyl aluminum was reacted with the surface hydroxy groups of the silica to obtain component [a] containing triethyl aluminum-treated silica (in which the surface hydroxy groups of the triethyl aluminum-treated silica were capped by the triethyl aluminum) and a supernatant. Then, the supernatant in the obtained reaction mixture was removed by decantation to remove unreacted triethyl aluminum in the supernatant. Then, an appropriate amount of hexane was added to the resulting silica to obtain 850 mL of hexane slurry of triethyl aluminum-treated silica.

Meanwhile, [(N-t-butylamido) (tetramethyl-$\eta^5$-cyclopentadienyl)dimethylsilane]titanium-1,3-pentadiene (hereinafter, referred to as a "titanium complex") was dissolved at 200 mmol in 1000 mL of Isopar E (trade name of hydrocarbon mixture manufactured by Exxon Chemical Co., Inc. (US)). To this solution, 20 mL of a hexane solution containing 1 mol/L compound of the formula $AlMg_6(C_2H_5)_3(n-C_4H_9)_{12}$ synthesized in advance from triethyl aluminum and dibutyl magnesium was added. The titanium complex concentration was adjusted to 0.1 mol/L by the addition of hexane to obtain component [b].

Bis(hydrogenated tallow alkyl)methylammonium-tris(pentafluorophenyl)(4-hydroxyphenyl) borate (hereinafter, referred to as a "borate") (5.7 g) was added to 50 mL of toluene and dissolved therein to obtain a 100 mmol/L toluene solution of the borate. To this toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 2 hours to obtain a reaction mixture containing the borate.

To 800 mL of the slurry of the component [a] obtained above, 46 mL of this reaction mixture containing the borate was added with stirring at 15 to 20° C. to allow the borate to be supported by the silica. In this way, slurry of the borate-supported silica was obtained. To this slurry, 32 mL of the component [b] obtained above was further added, and the mixture was stirred for 4 hours such that the titanium complex was reacted with the borate. Then, the supernatant in the obtained reaction mixture was removed by decantation to remove unreacted triethyl aluminum in the supernatant. In this way, supported metallocene catalyst [B] containing a catalytic active species formed on the silica was obtained.

Example 1

(Polymerization Step for Polyethylene)

Hexane, ethylene, hydrogen, and the solid catalytic component [A] were continuously supplied to a vessel-type polymerization reactor equipped with a stirring apparatus. A polyethylene (ethylene homopolymer) was produced at a rate of 10 kg/hr. The hydrogen was used at 99.99% by mol or more after being purified by the contact with a molecular sieve. The solid catalytic component [A] was added, together with 10 NL/hr of the hydrogen (NL represents normal liter (volume in terms of a normal state)), from the intermediate portion between the surface of the solution in the polymerization reactor and the bottom of the reactor at a rate of 0.15 mmol/L using the solvent hexane as a transporting solution such that the production rate was 10 kg/hr. The solid catalytic component [A] was also adjusted to 98° C. and added from the bottom of the polymerization reactor at a rate of 0.2 g/hr, while triisobutyl aluminum was adjusted to 22° C. and added from the bottom of the polymerization reactor at a rate of 5 mmol/hr. The polymerization temperature was kept at 88° C. by jacket cooling. The internal humidity of the polymerization reactor was kept at 0 ppm. The hexane was adjusted to 20° C. and supplied to the polymerization reactor at a rate of 60 L/hr. The ethylene was supplied from the bottom of the polymerization reactor to keep the polymerization pressure at 1.0 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultrahigh-molecular-weight polyethylene powder was 10% by mass based on the weight of the ultrahigh-molecular-weight polyethylene powder. The separated ultrahigh-molecular-weight polyethylene powder was dried at 65° C. for 3 hours under nitrogen blow and then further dried at 75° C. for 2 hours. In this drying step, steam was sprayed onto the powder after the polymerization to deactivate the catalyst and the promoter. The obtained ultrahigh-molecular-weight polyethylene powder was passed through a sieve having an aperture size of 425 μm such that particles that failed to pass through the sieve were removed to obtain an ultrahigh-molecular-weight polyethylene powder of Example 1. The physical properties of the obtained ultrahigh-molecular-weight polyethylene powder are shown in Table 1.

In the reactor, baffle plates were placed at 4 equally spaced locations from the bottom of the reactor to the top (opening) of the reactor. The baffle plates projected toward the side of the reactor. The distance from the top of the projection to the side of the reactor was 15% of the inside diameter of the reactor, and the projection width was 15% of the circumferential length of the reactor.

(Method for Producing Microporous Membrane for Secondary Battery Separator Using Ultrahigh-Molecular-Weight Polyethylene Powder)

40 parts by mass of the ultrahigh-molecular-weight polyethylene powder, 60 parts by mass of liquid paraffin, and 1 part by mass of an antioxidant were added per 100 parts by mass in total of the ultrahigh-molecular-weight polyethylene powder and the liquid paraffin to prepare a liquid in a slurry form. The obtained liquid in the slurry form was charged via a feeder into a twin screw extruder in the nitrogen atmosphere after purging with nitrogen. The liquid was kneaded under conditions of 200° C. and then extruded from a T die placed at the tip of the extruder. Immediately thereafter, the extrudate was solidified by cooling on a cast roll cooled to 25° C. to form a sheet in a gel form. This sheet in the gel form was drawn at 120° C. at a ratio of 7×7 using a simultaneous biaxial drawing machine. Then, this drawn film was dipped in methyl ethyl ketone or hexane for the extraction and removal of liquid paraffin, and then vacuum-dried for 24 hours. The film was further heat-set at 125° C. for 3 minutes to obtain a microporous membrane of Example 1. Results of evaluating the obtained microporous membrane are shown in Table 1.

Example 2

(Polymerization Step for Polyethylene)

An ultrahigh-molecular-weight polyethylene powder of Example 2 was obtained in the same way as in Example 1 except that: the polymerization temperature was 85° C.; the solid catalytic component [A] was charged into the reactor at 95° C.; and 1-butene was introduced at 6.3 mol % based on ethylene from a gas phase. The physical properties of the obtained ultrahigh-molecular-weight polyethylene powder are shown in Table 1.

(Method for Producing Microporous Membrane for Secondary Battery Separator Using Ultrahigh-Molecular-Weight Polyethylene Powder)

A microporous membrane of Example 2 was obtained in the same way as in Example 1 except that the obtained ultrahigh-molecular-weight polyethylene powder was used. Results of evaluating the obtained microporous membrane are shown in Table 1.

Example 3

(Polymerization Step for Polyethylene)

An ultrahigh-molecular-weight polyethylene powder of Example 3 was obtained in the same way as in Example 1 except that: the polymerization temperature was 83° C.; and the solid catalytic component [A] was charged into the reactor at 93° C. The physical properties of the obtained ultrahigh-molecular-weight polyethylene powder are shown in Table 1.

(Method for Producing Microporous Membrane for Secondary Battery Separator Using Ultrahigh-Molecular-Weight Polyethylene Powder)

30 parts by mass of the ultrahigh-molecular-weight polyethylene powder, 70 parts by mass of liquid paraffin, and 1 part by mass of an antioxidant were added per 100 parts by mass in total of the ultrahigh-molecular-weight polyethylene powder and the liquid paraffin to prepare a liquid in a slurry form. The obtained liquid in the slurry form was charged via a feeder into a twin screw extruder in the nitrogen atmosphere after purging with nitrogen. The liquid was kneaded under conditions of 200° C. and then extruded from a T die placed at the tip of the extruder. Immediately thereafter, the extrudate was solidified by cooling on a cast roll cooled to 25° C. to form a sheet in a gel form. This sheet in the gel form was drawn at 120° C. at a ratio of 7×7 using a simultaneous biaxial drawing machine. Then, this drawn film was dipped in methyl ethyl ketone or hexane for the extraction and removal of liquid paraffin, and then vacuum-dried for 24 hours. The film was further heat-set at 125° C. for 3 minutes to obtain a microporous membrane of Example 3. Results of evaluating the obtained microporous membrane are shown in Table 1.

Example 4

(Polymerization Step for Polyethylene)

Hexane, ethylene, hydrogen, and the supported metallocene catalytic component [B] were continuously supplied to a vessel-type polymerization reactor equipped with a stirring apparatus. A polyethylene (ethylene homopolymer) was produced at a rate of 10 kg/hr. The hydrogen was used at 99.99% by mol or more after being purified by the contact with a molecular sieve. The supported metallocene catalytic component [B] was added, together with 10 NL/hr of the hydrogen (NL represents normal liter (volume in terms of a normal state)), from the intermediate portion between the surface of the solution in the polymerization reactor and the bottom of the reactor at a rate of 0.15 mmol/L using the solvent hexane as a transporting solution such that the production rate was 10 kg/hr. The supported metallocene catalytic component [B] was also adjusted to 95° C. and added from the bottom of the polymerization reactor at a rate of 0.2 g/hr, while triisobutyl aluminum was adjusted to 22° C. and added from the intermediate portion of the polymerization reactor at a rate of 5 mmol/hr. The polymerization temperature was kept at 85° C. by jacket cooling. The internal humidity of the polymerization reactor was kept at 0 ppm. The hexane was adjusted to 20° C. and supplied from the bottom of the polymerization reactor at a rate of 60 L/hr. The ethylene was supplied from the bottom of the polymerization reactor to keep the polymerization pressure at 0.8 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultrahigh-molecular-weight polyethylene powder was 10% by mass based on the weight of the ultrahigh-molecular-weight polyethylene powder. The separated ultrahigh-molecular-weight polyethylene powder was dried at 65° C. for 3 hours under nitrogen blow and then further dried at 75° C. for 2 hours. In this drying step, steam was sprayed onto the powder after the polymerization to deactivate the catalyst and the promoter. The obtained ultrahigh-molecular-weight polyethylene powder was passed through a sieve having an aperture size of 425 μm such that particles that failed to pass through the sieve were removed to obtain an ultrahigh-molecular-weight polyethylene powder of Example 4. The physical properties of the obtained ultrahigh-molecular-weight polyethylene powder are shown in Table 1. In the reactor, baffle plates were placed at 4 equally spaced locations from the bottom of the reactor to the top (opening) of the reactor. The baffle plates projected toward the side of the reactor. The distance from the top of the projection to the side of the reactor was 15% of the inside diameter of the reactor, and the projection width was 15% of the circumferential length of the reactor.

(Method for Producing Microporous Membrane for Secondary Battery Separator Using Ultrahigh-Molecular-Weight Polyethylene Powder)

A microporous membrane of Example 4 was obtained in the same way as in Example 1 except that the obtained ultrahigh-molecular-weight polyethylene powder was used. Results of evaluating the obtained microporous membrane are shown in Table 1.

Example 5

(Polymerization Step for Polyethylene)

An ultrahigh-molecular-weight polyethylene powder of Example 5 was obtained in the same way as in Example 2 except that: the polymerization temperature was 84° C.; the solid catalytic component [A] was charged into the reactor at 94° C.; the polymerization pressure was 1.1 MPa; the activity was 18000 PE g/catalyst g; the separated ultrahigh-molecular-weight polyethylene powder was dried at 65° C. for 3 hours under nitrogen blow and then further dried at 70° C. for 2 hours; in the reactor, baffle plates were placed at 2 equally spaced locations; the baffle plates were disposed from the bottom of the reactor to the top (opening) of the reactor and projected toward the side of the reactor; and the distance from the top of the projection to the side of the reactor was changed to 10% of the inside diameter of the reactor, and the projection width was changed to 10% of the circumferential length of the reactor. The physical properties of the obtained ultrahigh-molecular-weight polyethylene powder are shown in Table 1.

(Method for Producing Microporous Membrane for Secondary Battery Separator Using Ultrahigh-Molecular-Weight Polyethylene Powder)

A microporous membrane of Example 5 was obtained in the same way as in Example 2 except that the obtained ultrahigh-molecular-weight polyethylene powder was used. Results of evaluating the obtained microporous membrane are shown in Table 1.

Example 6

(Polymerization Step for Polyethylene)

An ultrahigh-molecular-weight polyethylene powder of Example 6 was obtained in the same way as in Example 2 except that: the polymerization temperature was 84° C.; the solid catalytic component [A] was charged into the reactor at 94° C.; the polymerization pressure was 0.6 MPa; the activity was 16000 PE g/catalyst g; in the reactor, baffle plates were placed at 4 equally spaced locations; the baffle plates were disposed from the bottom of the reactor to the top (opening) of the reactor and projected toward the side of the reactor; and the distance from the top of the projection to the side of the reactor was changed to 25% of the inside diameter of the reactor, and the projection width was changed to 25% of the circumferential length of the reactor. The physical properties of the obtained ultrahigh-molecular-weight polyethylene powder are shown in Table 1.

(Method for Producing Microporous Membrane for Secondary Battery Separator Using Ultrahigh-Molecular-Weight Polyethylene Powder)

A microporous membrane of Example 6 was obtained in the same way as in Example 2 except that the obtained ultrahigh-molecular-weight polyethylene powder was used. Results of evaluating the obtained microporous membrane are shown in Table 1.

Example 7

(Polymerization Step for Polyethylene)

An ultrahigh-molecular-weight polyethylene powder of Example 7 was obtained in the same way as in Example 1 except that: the polymerization temperature was 80° C.; the solid catalytic component [A] was charged into the reactor at 90° C.; the polymerization pressure was 0.6 MPa; and the activity was 14000 PE g/catalyst g. The physical properties of the obtained ultrahigh-molecular-weight polyethylene powder are shown in Table 2.

(Method for Producing High-Strength Fiber Using Ultrahigh-Molecular-Weight Polyethylene Powder)

5 parts by mass of each ultrahigh-molecular-weight polyethylene powder, 95 parts by mass of liquid paraffin, and 1 part by mass of an antioxidant were added per 100 parts by mass in total of the ultrahigh-molecular-weight polyethylene powder and the liquid paraffin to prepare a liquid in a slurry form.

Next, the liquid in the slurry form was vacuum-deaerated with stirring at 80° C. for 1 hour and then introduced into an extruder. The liquid in the slurry form in the extruder was kneaded in the nitrogen atmosphere, and the oxygen concentration was adjusted to 0.1% or lower. A twin screw extruder was used as the extruder into which the liquid in the slurry form was introduced.

The temperature at which the liquid in the slurry form was formed in the extruder was 200° C. The melt retention time within the extruder was 10 minutes.

Then, the liquid was spun through a spinneret attached to the tip of the extruder. The temperature of the spinneret was 200° C. The discharge rate was 0.5 g/min. The pore size of the spinneret was 1.0 mm.

Next, the discharged thread containing the liquid paraffin was charged into a water bath of 5° C. via an air gap of 4 cm and wound while rapidly cooled. The winding rate was 30 m/min.

Subsequently, the liquid paraffin was removed from the thread. The thread was dipped in a solvent such as hexane, followed by extraction operation and subsequent drying in vacuum for 24 hours.

The obtained thread was brought into contact with a metal heater such that the temperature of the thread reached 120° C. The thread was primarily drawn, and the drawn thread was wound. Subsequently, the drawn thread was brought into contact with a metal heater such that the temperature of the drawn thread reached 140° C. The thread was further secondarily drawn. The thread was drawn immediately before being broken to obtain a drawn thread. Results of evaluating the obtained high-strength fiber are shown in Table 2.

Example 8

(Polymerization Step for Polyethylene)

An ultrahigh-molecular-weight polyethylene powder of Example 8 was obtained in the same way as in Example 7 except that: the polymerization temperature was 78° C.; the solid catalytic component [A] was charged into the reactor at 88° C.; 1-butene was introduced at 6.3 mol % based on ethylene from a gas phase; and the activity was 12000 PE g/catalyst g. The physical properties of the obtained ultrahigh-molecular-weight polyethylene powder are shown in Table 2.

(Method for Producing High-Strength Fiber Using Ultrahigh-Molecular-Weight Polyethylene Powder)

A high-strength fiber of Example 8 was obtained in the same way as in Example 7 except that the obtained ultrahigh-molecular-weight polyethylene powder was used. Results of evaluating the obtained high-strength fiber are shown in Table 2.

Example 9

(Polymerization Step for Polyethylene)

An ultrahigh-molecular-weight polyethylene powder of Example 9 was obtained in the same way as in Example 7 except that: the polymerization temperature was 70° C.; the solid catalytic component [A] was charged into the reactor at 80° C.; and the activity was 9000 PE g/catalyst g. The physical properties of the obtained ultrahigh-molecular-weight polyethylene powder are shown in Table 2.

(Method for Producing High-Strength Fiber Using Ultra-high-Molecular-Weight Polyethylene Powder)

5 parts by mass of each ultrahigh-molecular-weight polyethylene powder, 95 parts by mass of liquid paraffin, and 1 part by mass of an antioxidant were added per 100 parts by mass in total of the ultrahigh-molecular-weight polyethylene powder and the liquid paraffin to prepare a liquid in a slurry form.

Next, the liquid in the slurry form was vacuum-deaerated with stirring at 80° C. for 1 hour and then introduced into an extruder. The liquid in the slurry form in the extruder was kneaded in the nitrogen atmosphere, and the oxygen concentration was adjusted to 0.1% or lower. A twin screw extruder was used as the extruder into which the liquid in the slurry form was introduced.

The temperature at which the liquid in the slurry form formed in the extruder was 220° C. The melt retention time within the extruder was 10 minutes.

Then, the liquid was spun through a spinneret attached to the tip of the extruder. The temperature of the spinneret was 220° C. The discharge rate was 0.5 g/min. The pore size of the spinneret was 0.6 mm.

Next, the discharged thread containing the liquid paraffin was charged into a water bath of 5° C. via an air gap of 3 cm and wound while rapidly cooled. The winding rate was 30 m/min.

Subsequently, the liquid paraffin was removed from the thread. The thread was dipped in a solvent such as hexane, followed by extraction operation and subsequent drying in vacuum for 24 hours.

The obtained thread was brought into contact with a metal heater such that the temperature of the thread reached 120° C. The thread was primarily drawn, and the drawn thread was wound. Subsequently, the drawn thread was brought into contact with a metal heater such that the temperature of the drawn thread reached 140° C. The thread was further secondarily drawn. The thread was drawn immediately before being broken to obtain a drawn thread. Results of evaluating the obtained high-strength fiber are shown in Table 2.

Example 10

(Polymerization Step for Polyethylene)

An ultrahigh-molecular-weight polyethylene powder of Example 10 was obtained in the same way as in Example 7 except that: the polymerization pressure was 0.5 MPa; the activity was 12000 PE g/catalyst g; in the reactor, baffle plates were placed at 6 equally spaced locations; the baffle plates were disposed from the bottom of the reactor to the top (opening) of the reactor and projected toward the side of the reactor; and the distance from the top of the projection to the side of the reactor was changed to 30% of the inside diameter of the reactor, and the projection width was changed to 30% of the circumferential length of the reactor. The physical properties of the obtained ultrahigh-molecular-weight polyethylene powder are shown in Table 2.

(Method for Producing High-Strength Fiber Using Ultra-high-Molecular-Weight Polyethylene Powder)

A high-strength fiber of Example 10 was obtained in the same way as in Example 7 except that the obtained ultra-high-molecular-weight polyethylene powder was used. Results of evaluating the obtained high-strength fiber are shown in Table 2.

Example 11

(Polymerization Step for Polyethylene)

An ultrahigh-molecular-weight polyethylene powder of Example 11 was obtained in the same way as in Example 8 except that: the polymerization pressure was 0.5 MPa; the activity was 8000 PE g/catalyst g; in the reactor, baffle plates were placed at 2 equally spaced locations; the baffle plates were disposed from the bottom of the reactor to the top (opening) of the reactor and projected toward the side of the reactor; and the distance from the top of the projection to the side of the reactor was changed to 10% of the inside diameter of the reactor, and the projection width was changed to 10% of the circumferential length of the reactor. The physical properties of the obtained ultrahigh-molecular-weight polyethylene powder are shown in Table 2.

(Method for Producing High-Strength Fiber Using Ultra-high-Molecular-Weight Polyethylene Powder)

A high-strength fiber of Example 11 was obtained in the same way as in Example 8 except that the obtained ultra-high-molecular-weight polyethylene powder was used. Results of evaluating the obtained high-strength fiber are shown in Table 2.

Example 12

(Polymerization Step for Polyethylene)

An ultrahigh-molecular-weight polyethylene powder of Example 12 was obtained in the same way as in Example 9 except that: the polymerization pressure was 0.5 MPa; the activity was 7000 PE g/catalyst g; in the reactor, baffle plates were placed at 2 equally spaced locations; the baffle plates were disposed from the bottom of the reactor to the top (opening) of the reactor and projected toward the side of the reactor; and the distance from the top of the projection to the side of the reactor was changed to 10% of the inside diameter of the reactor, and the projection width was changed to 10% of the circumferential length of the reactor. The physical properties of the obtained ultrahigh-molecular-weight polyethylene powder are shown in Table 2.

(Method for Producing High-Strength Fiber Using Ultra-high-Molecular-Weight Polyethylene Powder)

A high-strength fiber of Example 12 was obtained in the same way as in Example 9 except that the obtained ultra-high-molecular-weight polyethylene powder was used. Results of evaluating the obtained high-strength fiber are shown in Table 2.

Example 13

(Polymerization Step for Polyethylene)

An ultrahigh-molecular-weight polyethylene powder of Example 13 was obtained in the same way as in Example 4 except that: the polymerization temperature was 76° C.; the solid catalytic component [B] was charged into the reactor at 86° C.; the polymerization pressure was 0.6 MPa; 1-butene was introduced at 6.3 mol % based on ethylene from a gas phase; the activity was 11000 PE g/catalyst g; in the reactor, baffle plates were placed at 4 equally spaced locations; the baffle plates were disposed from the bottom of the reactor to the top (opening) of the reactor and projected toward the side of the reactor; and the distance from the top of the projection to the side of the reactor was changed to 20% of the inside diameter of the reactor, and the projection width was changed to 20% of the circumferential length of the reactor. The physical properties of the obtained ultrahigh-molecular-weight polyethylene powder are shown in Table 2.

(Method for Producing High-Strength Fiber Using Ultrahigh-Molecular-Weight Polyethylene Powder)

A high-strength fiber of Example 13 was obtained in the same way as in Example 8 except that the obtained ultrahigh-molecular-weight polyethylene powder was used. Results of evaluating the obtained high-strength fiber are shown in Table 2.

Comparative Example 1

(Polymerization Step for Polyethylene)

Hexane, ethylene, hydrogen, and the solid catalytic component [A] were continuously supplied to a vessel-type polymerization reactor equipped with a stirring apparatus. A polyethylene (ethylene homopolymer) was produced at a rate of 10 kg/hr. The hydrogen was used at 99.99% by mol or more after being purified by the contact with a molecular sieve. The solid catalytic component [A] was added, together with 10 NL/hr of the hydrogen (NL represents normal liter (volume in terms of a normal state)), from the intermediate portion between the surface of the solution in the polymerization reactor and the bottom of the reactor at a rate of 0.15 mmol/L using the solvent hexane as a transporting solution such that the production rate was 10 kg/hr. The solid catalytic component [A] was also adjusted to 20° C. and added from the bottom of the polymerization reactor at a rate of 0.2 g/hr, while triisobutyl aluminum was adjusted to 22° C. and added from the bottom of the polymerization reactor at a rate of 5 mmol/hr. The polymerization temperature was kept at 88° C. by jacket cooling. The internal humidity of the polymerization reactor was kept at 0 ppm. The hexane was adjusted to 20° C. and supplied to the polymerization reactor at a rate of 60 L/hr. The ethylene was supplied from the bottom of the polymerization reactor to keep the polymerization pressure at 1.0 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultrahigh-molecular-weight polyethylene powder was 10% by mass based on the weight of the ultrahigh-molecular-weight polyethylene powder. The separated ultrahigh-molecular-weight polyethylene powder was dried at 100° C. for 5 hours under nitrogen blow. In this drying step, steam was sprayed onto the powder after the polymerization to deactivate the catalyst and the promoter. The obtained ultrahigh-molecular-weight polyethylene powder was passed through a sieve having an aperture size of 425 μm such that particles that failed to pass through the sieve were removed to obtain an ultrahigh-molecular-weight polyethylene powder of Comparative Example 1. The physical properties of the obtained ultrahigh-molecular-weight polyethylene powder are shown in Table 1.

(Method for Producing Microporous Membrane for Secondary Battery Separator Using Ultrahigh-Molecular-Weight Polyethylene Powder)

40 parts by mass of the ultrahigh-molecular-weight polyethylene powder, 60 parts by mass of liquid paraffin, and 1 part by mass of an antioxidant were added per 100 parts by mass in total of the ultrahigh-molecular-weight polyethylene powder and the liquid paraffin to prepare a liquid in a slurry form. The obtained liquid in the slurry form was charged via a feeder into a twin screw extruder in the nitrogen atmosphere after purging with nitrogen. The liquid was kneaded under conditions of 200° C. and then extruded from a T die placed at the tip of the extruder. Immediately thereafter, the extrudate was solidified by cooling on a cast roll cooled to 25° C. to form a sheet in a gel form. This sheet in the gel form was drawn at 120° C. at a ratio of 7×7 using a simultaneous biaxial drawing machine. Then, this drawn film was dipped in methyl ethyl ketone or hexane for the extraction and removal of liquid paraffin, and then vacuum-dried for 24 hours. The film was further heat-set at 125° C. for 3 minutes to obtain a microporous membrane of Comparative Example 1. Results of evaluating the obtained microporous membrane are shown in Table 1.

Comparative Example 2

(Polymerization Step for Polyethylene)

An ultrahigh-molecular-weight polyethylene powder of Comparative Example 2 was obtained in the same way as in Comparative Example 1 except that: the polymerization temperature was 85° C.; 1-butene was introduced at 6.3 mol % based on ethylene from a gas phase; and the separated ultrahigh-molecular-weight polyethylene powder was dried at 65° C. for 3 hours under nitrogen blow and then further dried at 75° C. for 2 hours. The physical properties of the obtained ultrahigh-molecular-weight polyethylene powder are shown in Table 1.

(Method for Producing Microporous Membrane for Secondary Battery Separator Using Ultrahigh-Molecular-Weight Polyethylene Powder)

A microporous membrane of Comparative Example 2 was obtained in the same way as in Comparative Example 1 except that the obtained ultrahigh-molecular-weight polyethylene powder was used. Results of evaluating the obtained microporous membrane are shown in Table 1.

Comparative Example 3

(Polymerization Step for Polyethylene)

An ultrahigh-molecular-weight polyethylene powder of Comparative Example 3 was obtained in the same way as in Comparative Example 1 except that the polymerization temperature was 90° C. The physical properties of the obtained ultrahigh-molecular-weight polyethylene powder are shown in Table 1.

(Method for Producing Microporous Membrane for Secondary Battery Separator Using Ultrahigh-Molecular-Weight Polyethylene Powder)

An attempt was made to obtain a microporous membrane of Comparative Example 3 in the same way as in Comparative Example 1 except that the obtained ultrahigh-molecular-weight polyethylene powder was used. However, the membrane was broken when drawn by simultaneous biaxial drawing; thus, the membrane was unable to be drawn at a ratio of 7×7. Accordingly, the microporous membrane was unable to be obtained.

Comparative Example 4

(Polymerization Step for Polyethylene)

An ultrahigh-molecular-weight polyethylene powder of Comparative Example 4 was obtained in the same way as in Comparative Example 1 except that: the polymerization temperature was 75° C.; the polymerization pressure was 0.8 MPa; 1-butene was introduced at 6.3 mol % based on ethylene from a gas phase; and the activity was 18000 PE g/catalyst g. The physical properties of the obtained ultrahigh-molecular-weight polyethylene powder are shown in Table 2.

(Method for Producing High-Strength Fiber Using Ultrahigh-Molecular-Weight Polyethylene Powder)

5 parts by mass of each ultrahigh-molecular-weight polyethylene powder, 95 parts by mass of liquid paraffin, and 1 part by mass of an antioxidant were added per 100 parts by mass in total of the ultrahigh-molecular-weight polyethylene powder and the liquid paraffin to prepare a liquid in a slurry form.

Next, the liquid in the slurry form was vacuum-deaerated with stirring at 80° C. for 1 hour and then introduced into an extruder. The liquid in the slurry form in the extruder was kneaded in the nitrogen atmosphere, and the oxygen concentration was adjusted to 0.1% or lower. A twin screw extruder was used as the extruder into which the liquid in the slurry form was introduced.

The temperature at which the liquid in the slurry form was formed in the extruder was 200° C. The melt retention time within the extruder was 10 minutes.

Then, the liquid was spun through a spinneret attached to the tip of the extruder. The temperature of the spinneret was 200° C. The discharge rate was 0.5 g/min. The pore size of the spinneret was 1.0 mm.

Next, the discharged thread containing the liquid paraffin was charged into a water bath of 5° C. via an air gap of 4 cm and wound while rapidly cooled. The winding rate was 30 m/min.

Subsequently, the liquid paraffin was removed from the thread. The thread was dipped in a solvent such as hexane, followed by extraction operation and subsequent drying in vacuum for 24 hours.

The obtained thread was brought into contact with a metal heater such that the temperature of the thread reached 120° C. The thread was primarily drawn, and the drawn thread was wound. Subsequently, the drawn thread was brought into contact with a metal heater such that the temperature of the drawn thread reached 140° C. The thread was further secondarily drawn. The thread was drawn immediately before being broken to obtain a drawn thread. Results of evaluating the obtained high-strength fiber are shown in Table 2.

Comparative Example 5

(Polymerization Step for Polyethylene)

An ultrahigh-molecular-weight polyethylene powder of Comparative Example 5 was obtained in the same way as in Comparative Example 1 except that: the polymerization temperature was 70° C.; the polymerization pressure was 0.6 MPa; the activity was 12000 PE g/catalyst g; and in the reactor, baffle plates were placed at 4 equally spaced locations (the baffle plates were disposed from the bottom of the reactor to the top (opening) of the reactor and projected toward the side of the reactor, and the distance from the top of the projection to the side of the reactor was 15% of the inside diameter of the reactor, and the projection width was 15% of the circumferential length of the reactor). The physical properties of the obtained ultrahigh-molecular-weight polyethylene powder are shown in Table 2.

(Method for Producing High-Strength Fiber Using Ultrahigh-Molecular-Weight Polyethylene Powder)

5 parts by mass of each ultrahigh-molecular-weight polyethylene powder, 95 parts by mass of liquid paraffin, and 1 part by mass of an antioxidant were added per 100 parts by mass in total of the ultrahigh-molecular-weight polyethylene powder and the liquid paraffin to prepare a liquid in a slurry form.

Next, the liquid in the slurry form was vacuum-deaerated with stirring at 80° C. for 1 hour and then introduced into an extruder. The liquid in the slurry form in the extruder was kneaded in the nitrogen atmosphere, and the oxygen concentration was adjusted to 0.1% or lower. A twin screw extruder was used as the extruder into which the liquid in the slurry form was introduced.

The temperature at which the liquid in the slurry form was formed in the extruder was 220° C. The melt retention time within the extruder was 10 minutes.

Then, the liquid was spun through a spinneret attached to the tip of the extruder. The temperature of the spinneret was 220° C. The discharge rate was 0.5 g/min. The pore size of the spinneret was 0.6 mm.

Next, the discharged thread containing the liquid paraffin was charged into a water bath of 5° C. via an air gap of 3 cm and wound while rapidly cooled. The winding rate was 30 m/min.

Subsequently, the liquid paraffin was removed from the thread. The thread was dipped in a solvent such as hexane, followed by extraction operation and subsequent drying in vacuum for 24 hours.

The obtained thread was brought into contact with a metal heater such that the temperature of the thread reached 120° C. The thread was primarily drawn, and the drawn thread was wound. Subsequently, the drawn thread was brought into contact with a metal heater such that the temperature of the drawn thread reached 140° C. The thread was further secondarily drawn. The thread was drawn immediately before being broken to obtain a drawn thread. Results of evaluating the obtained high-strength fiber are shown in Table 2.

Comparative Example 6

(Polymerization Step for Polyethylene)

Hexane, ethylene, hydrogen, and the supported metallocene catalytic component [B] were continuously supplied to a vessel-type polymerization reactor equipped with a stirring apparatus. A polyethylene (ethylene homopolymer) was produced at a rate of 10 kg/hr. The hydrogen was used at 99.99% by mol or more after being purified by the contact with a molecular sieve. The supported metallocene catalytic component [B] was added, together with 10 NL/hr of the hydrogen (NL represents normal liter (volume in terms of a normal state)), from the intermediate portion between the surface of the solution in the polymerization reactor and the bottom of the reactor at a rate of 0.15 mmol/L using the solvent hexane as a transporting solution such that the production rate was 10 kg/hr. The supported metallocene catalytic component [B] was also adjusted to 86° C. and added from the bottom of the polymerization reactor at a rate of 0.2 g/hr, while triisobutyl aluminum was adjusted to 22° C. and added from the intermediate portion of the polymerization reactor at a rate of 5 mmol/hr. The polymerization temperature was kept at 76° C. by jacket cooling. The internal humidity of the polymerization reactor was kept at 0 ppm. The hexane was adjusted to 20° C. and supplied from the bottom of the polymerization reactor at a rate of 60 L/hr. The ethylene was supplied from the bottom of the polymerization reactor to keep the polymerization pressure at 0.6 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultrahigh-molecular-weight polyethylene powder was 10% by mass based on the weight of the ultrahigh-molecular-weight polyethylene powder. The separated ultrahigh-molecular-weight polyethylene powder was dried at 100° C. for 5 hours under nitrogen blow. In this drying step, steam was sprayed onto the powder after the polymerization to deactivate the catalyst and the promoter. The obtained ultrahigh-molecular-weight polyethylene powder was passed through a sieve having an aperture size of 425 μm such that particles that failed to pass through the sieve were removed to obtain an ultrahigh-molecular-weight polyethylene powder of Comparative Example 6. The physical properties of the obtained ultrahigh-molecular-weight polyethylene powder are shown in Table 2.

(Method for Producing High-Strength Fiber Using Ultrahigh-Molecular-Weight Polyethylene Powder)

A high-strength fiber of Comparative Example 6 was obtained in the same way as in Comparative Example 4 except that the obtained ultrahigh-molecular-weight polyethylene powder was used. Results of evaluating the obtained high-strength fiber are shown in Table 2.

Comparative Example 7

(Polymerization Step for Polyethylene)

An ultrahigh-molecular-weight polyethylene powder of Comparative Example 7 was obtained in the same way as in Comparative Example 1 except that: the polymerization temperature was 63° C.; the polymerization pressure was 0.6 MPa; and the activity was 6000 PE g/catalyst g. The physical properties of the obtained ultrahigh-molecular-weight polyethylene powder are shown in Table 2.

(Method for Producing High-Strength Fiber Using Ultrahigh-Molecular-Weight Polyethylene Powder)

5 parts by mass of each ultrahigh-molecular-weight polyethylene powder, 95 parts by mass of liquid paraffin, and 1 part by mass of an antioxidant were added per 100 parts by mass in total of the ultrahigh-molecular-weight polyethylene powder and the liquid paraffin to prepare a liquid in a slurry form.

Next, the liquid in the slurry form was vacuum-deaerated with stirring at 80° C. for 1 hour and then introduced into an extruder. The liquid in the slurry form in the extruder was kneaded in the nitrogen atmosphere, and the oxygen concentration was adjusted to 0.1% or lower. A twin screw extruder was used as the extruder into which the liquid in the slurry form was introduced.

The temperature at which the liquid in the slurry form was formed in the extruder was 260° C. The melt retention time within the extruder was 10 minutes.

Then, the liquid was spun through a spinneret attached to the tip of the extruder. The temperature of the spinneret was 240° C. The discharge rate was 0.5 g/min. The pore size of the spinneret was 0.6 mm.

Next, the discharged thread containing the liquid paraffin was charged into a water bath of 5° C. via an air gap of 3 cm and wound while rapidly cooled. The winding rate was 20 m/min.

Subsequently, the liquid paraffin was removed from the thread. The thread was dipped in a solvent such as hexane, followed by extraction operation and subsequent drying in vacuum for 24 hours.

The obtained thread was brought into contact with a metal heater such that the temperature of the thread reached 120° C. The thread was primarily drawn, and the drawn thread was wound. Subsequently, the drawn thread was brought into contact with a metal heater such that the temperature of the drawn thread reached 140° C. The thread was further secondarily drawn. The thread was drawn immediately before being broken to obtain a drawn thread. Results of evaluating the obtained high-strength fiber are shown in Table 2.

TABLE 1

| | | Example | | | | |
|---|---|---|---|---|---|---|
| | | 1 | 2 | 3 | 4 | 5 |
| Physical properties | Catalyst | Ziegler | Ziegler | Ziegler | Metallocene | Ziegler |
| | Polyethylene | Homo | Copoly | Homo | Homo | Copoly |
| | Viscosity-average molecular weight (×10^4) | 15 | 30 | 70 | 30 | 50 |
| | {Mv − Mv(A)}/Mv | 0.1 | 0.15 | 0.07 | 0.12 | 0.13 |
| | Average pore volume of powder having particle size of 212 μm or larger (ml/g) | 0.7 | 0.8 | 0.8 | 1.5 | 0.8 |
| | Average pore size of powder having particle size of 212 μm or larger (μm) | 0.32 | 0.42 | 0.44 | 0.51 | 0.45 |
| | Proportion of particle having particle size of 53 μm or smaller (% by mass) | 5 | 5 | 12 | 15 | 8 |
| | Bulk density of powder having particle size of 212 μm or larger (g/cm$^3$) | 0.5 | 0.5 | 0.52 | 0.31 | 0.40 |
| | Amount of Mg (ppm) | 2.4 | 1.3 | 1.6 | 0.55 | 0.34 |
| | Amount of Ti (ppm) | 0.27 | 1.9 | 2.4 | 0.4 | 3.5 |
| | Amount of Al (ppm) | 3.6 | 2.2 | 2.8 | 4.4 | 2.1 |
| | Amount of Si (ppm) | 1.0 | 1.3 | 1.1 | 35 | 1.3 |
| | Amount of Cl (ppm) | 10 | 12 | 14 | 2 | 13 |
| | Mg/Ti ratio | 8.89 | 0.68 | 0.67 | 1.38 | 0.097 |
| | Al/Ti ratio | 13.33 | 1.16 | 1.17 | 11.00 | 0.60 |

TABLE 1-continued

| | | | | | | |
|---|---|---|---|---|---|---|
| Production method | Polymerization temperature | 88 | 85 | 83 | 85 | 84 |
| | Polymerization pressure MPa | 1.0 | 1.0 | 1.0 | 0.8 | 1.1 |
| | Activity g/gs | 20000 | 20000 | 20000 | 16000 | 18000 |
| | Catalyst temperature (° C.) | 98 | 95 | 93 | 95 | 94 |
| | Presence or absence of baffle plates | Present | Present | Present | Present | Present |
| | The number of baffle plates | 4 | 4 | 4 | 4 | 2 |
| | Length from top of projection to side of reactor (percentage to inside diameter of reactor (%)) | 15 | 15 | 15 | 15 | 10 |
| | Length of projection width (percentage to circumferential length of reactor (%)) | 15 | 15 | 15 | 15 | 10 |
| | Two-stage drying, first stage: 60-70° C., second stage: 70-80° C. | 65° C./75° C. | 65° C./75° C. | 65° C./75° C. | 65° C./75° C. | 60° C./70° C. |
| Effect Microporous membrane | Presence or absence of gum: ⊚, ○, X | ⊚ | ⊚ | ⊚ | ⊚ | ⊚ |
| | Presence or absence of lamp black: ⊚, ○, X | ⊚ | ⊚ | ⊚ | ⊚ | ⊚ |
| | Uniformity of film thickness: ⊚, ○, X | ⊚ | ⊚ | ⊚ | ⊚ | ⊚ |
| | Rate of shrinkage of membrane: ⊚, ○, X | ⊚ | ⊚ | ⊚ | ⊚ | ⊚ |
| | Puncture strength of membrane: ⊚, ○, X | ⊚ | ⊚ | ⊚ | ⊚ | ⊚ |

| | | Example | Comparative Example | | |
|---|---|---|---|---|---|
| | | 6 | 1 | 2 | 3 |
| Physical properties | Catalyst | Ziegler | Ziegler | Ziegler | Ziegler |
| | Polyethylene | Copoly | Homo | Copoly | Homo |
| | Viscosity-average molecular weight (×10^4) | 60 | 15 | 30 | 9 |
| | {Mv − Mv(A)}/Mv | 0.15 | 0.27 | 0.37 | 0.33 |
| | Average pore volume of powder having particle size of 212 μm or larger (ml/g) | 0.8 | 0.51 | 0.55 | 0.54 |
| | Average pore size of powder having particle size of 212 μm or larger (μm) | 0.47 | 0.24 | 0.28 | 0.26 |
| | Proportion of particle having particle size of 53 μm or smaller (% by mass) | 7 | 46 | 30 | 41 |
| | Bulk density of powder having particle size of 212 μm or larger (g/cm³) | 0.47 | 0.56 | 0.58 | 0.56 |
| | Amount of Mg (ppm) | 6.8 | 2.4 | 2.5 | 0.9 |
| | Amount of Ti (ppm) | 2.0 | 2.2 | 3.2 | 1.5 |
| | Amount of Al (ppm) | 1.7 | 3.4 | 4.1 | 2.2 |
| | Amount of Si (ppm) | 1.0 | 1.9 | 2.0 | 2.1 |
| | Amount of Cl (ppm) | 15 | 14 | 16 | 12 |
| | Mg/Ti ratio | 3.40 | 1.09 | 0.78 | 0.60 |
| | Al/Ti ratio | 0.85 | 1.55 | 1.28 | 1.47 |
| Production method | Polymerization temperature | 84 | 88 | 85 | 90 |
| | Polymerization pressure MPa | 0.6 | 1.0 | 1.0 | 1.0 |
| | Activity g/gs | 16000 | 20000 | 20000 | 20000 |
| | Catalyst temperature (° C.) | 94 | 20 | 20 | 20 |
| | Presence or absence of baffle plates | Present | Absent | Absent | Absent |
| | The number of baffle plates | 4 | — | — | — |
| | Length from top of projection to side of reactor (percentage to inside diameter of reactor (%)) | 25 | — | — | — |
| | Length of projection width (percentage to circumferential length of reactor (%)) | 25 | — | — | — |
| | Two-stage drying, first stage: 60-70° C., second stage: 70-80° C. | 65° C./75° C. | 100° C. constant | 65° C./75° C. | 100° C. constant |
| Effect Microporous membrane | Presence or absence of gum: ⊚, ○, X | ⊚ | X | X | Not drawable |
| | Presence or absence of lamp black: ⊚, ○, X | ⊚ | X | X | Not drawable |
| | Uniformity of film thickness: ⊚, ○, X | ⊚ | X | ○ | Not drawable |
| | Rate of shrinkage of membrane: ⊚, ○, X | ⊚ | X | ○ | Not drawable |
| | Puncture strength of membrane: ⊚, ○, X | ⊚ | X | ○ | Not drawable |

TABLE 2

| | | Example | | | | | |
|---|---|---|---|---|---|---|---|
| | | 7 | 8 | 9 | 10 | 11 | 12 |
| Physical properties | Catalyst | Ziegler | Ziegler | Ziegler | Ziegler | Ziegler | Ziegler |
| | Polyethylene | Homo | Copoly | Homo | Homo | Copoly | Homo |
| | Viscosity-average molecular weight (×10^4) | 300 | 450 | 750 | 300 | 450 | 750 |
| | {Mv − Mv(A)}/Mv | 0.06 | 0.18 | 0.05 | 0.05 | 0.19 | 0.04 |
| | Average pore volume of powder having particle size of 212 μm or larger (ml/g) | 0.8 | 0.8 | 0.9 | 0.8 | 0.8 | 0.9 |
| | Average pore size of powder having particle size of 212 μm or larger (μm) | 0.52 | 0.43 | 0.52 | 0.53 | 0.44 | 0.52 |

TABLE 2-continued

|  |  |  |  |  |  |  |  |
|---|---|---|---|---|---|---|---|
|  | Proportion of particle having particle size of 53 μm or smaller (% by mass) | 21 | 28 | 23 | 21 | 28 | 28 |
|  | Bulk density of powder having particle size of 212 μm or larger (g/cm$^3$) | 0.43 | 0.42 | 0.46 | 0.44 | 0.43 | 0.45 |
|  | Amount of Mg (ppm) | 7.2 | 14.3 | 16.7 | 7.0 | 14.0 | 16.5 |
|  | Amount of Ti (ppm) | 1.1 | 2.1 | 3.1 | 1.2 | 6.5 | 12.8 |
|  | Amount of Al (ppm) | 8.9 | 9.3 | 9.8 | 28 | 46 | 58 |
|  | Amount of Si (ppm) | 1.1 | 1.4 | 1.5 | 1.0 | 1.0 | 1.0 |
|  | Amount of Cl (ppm) | 24 | 35 | 41 | 36 | 70 | 25 |
|  | Mg/Ti ratio | 6.55 | 6.81 | 5.39 | 5.8 | 2.15 | 1.29 |
|  | Al/Ti ratio | 8.09 | 4.43 | 3.16 | 23.3 | 7.08 | 4.53 |
| Production method | Polymerization temperature | 80 | 78 | 70 | 80 | 78 | 70 |
|  | Polymerization pressure MPa | 0.6 | 0.6 | 0.6 | 0.5 | 0.5 | 0.5 |
|  | Activity g/gs | 14000 | 12000 | 9000 | 12000 | 8000 | 7000 |
|  | Catalyst temperature (° C.) | 90 | 88 | 80 | 90 | 88 | 80 |
|  | Presence or absence of baffle plates | Present | Present | Present | Present | Present | Present |
|  | The number of baffle plates | 4 | 4 | 4 | 6 | 2 | 2 |
|  | Length from top of projection to side of reactor (percentage to inside diameter of reactor (%)) | 15 | 15 | 15 | 30 | 10 | 10 |
|  | Length of projection width (percentage to circumferential length of reactor (%)) | 15 | 15 | 15 | 30 | 10 | 10 |
|  | Two-stage drying, first stage: 60-70° C., second stage: 70-80° C. | 65° C./75° C. | 65° C./75° C. | 65° C./75° C. | 65° C./75° C. | 65° C./75° C. | 65° C./75° C. |
| Effect High-strength fiber | Presence or absence of gum: ⊚, ○, X | ⊚ | ⊚ | ⊚ | ○ | ⊚ | ⊚ |
|  | Presence or absence of lamp black: ⊚, ○, X | ⊚ | ⊚ | ⊚ | ○ | ⊚ | ⊚ |
|  | Uniformity of thread diameter: ⊚, ○, X | ⊚ | ⊚ | ⊚ | ○ | ○ | ○ |
|  | Breaking strength of thread: ⊚, ○, X | ⊚ | ⊚ | ⊚ | ○ | ○ | ○ |
|  | Degree of orientation of thread: ⊚, ○, X | ⊚ | ⊚ | ⊚ | ○ | ○ | ○ |

|  |  | Example | Comparative Example | | | |
|---|---|---|---|---|---|---|
|  |  | 13 | 4 | 5 | 6 | 7 |
| Physical properties | Catalyst | Metallocene | Ziegler | Ziegler | Metallocene | Ziegler |
|  | Polyethylene | Copoly | Copoly | Homo | Homo | Homo |
|  | Viscosity-average molecular weight (×10$^4$) | 470 | 450 | 750 | 470 | 1050 |
|  | {Mv − Mv(A)}/Mv | 0.12 | 0.38 | 0.22 | 0.19 | 0.25 |
|  | Average pore volume of powder having particle size of 212 μm or larger (ml/g) | 1.7 | 0.56 | 0.60 | 0.58 | 0.59 |
|  | Average pore size of powder having particle size of 212 μm or larger (μm) | 0.64 | 0.22 | 0.30 | 0.28 | 0.29 |
|  | Proportion of particle having particle size of 53 μm or smaller (% by mass) | 30 | 44 | 45 | 41 | 40 |
|  | Bulk density of powder having particle size of 212 μm or larger (g/cm$^3$) | 0.34 | 0.58 | 0.56 | 0.56 | 0.57 |
|  | Amount of Mg (ppm) | 1.2 | 5.3 | 12.3 | 1.2 | 16.4 |
|  | Amount of Ti (ppm) | 0.8 | 4.2 | 4.8 | 0.9 | 5.0 |
|  | Amount of Al (ppm) | 6.0 | 6.1 | 8.5 | 6.0 | 9.3 |
|  | Amount of Si (ppm) | 50 | 2.5 | 2.7 | 56 | 2.8 |
|  | Amount of Cl (ppm) | 7 | 19 | 25 | 6 | 43 |
|  | Mg/Ti ratio | 1.50 | 1.262 | 2.56 | 1.33 | 3.28 |
|  | Al/Ti ratio | 7.50 | 1.45 | 1.77 | 6.67 | 1.86 |
| Production method | Polymerization temperature | 76 | 75 | 70 | 76 | 63 |
|  | Polymerization pressure MPa | 0.6 | 0.8 | 0.6 | 0.6 | 0.6 |
|  | Activity g/gs | 11000 | 18000 | 12000 | 11000 | 6000 |
|  | Catalyst temperature (° C.) | 86 | 20 | 20 | 86 | 20 |
|  | Presence or absence of baffle plates | Present | Absent | Present | Absent | Absent |
|  | The number of baffle plates | 4 | — | 4 | — | — |
|  | Length from top of projection to side of reactor (percentage to inside diameter of reactor (%)) | 20 | — | 15 | — | — |
|  | Length of projection width (percentage to circumferential length of reactor (%)) | 20 | — | 15 | — | — |
|  | Two-stage drying, first stage: 60-70° C., second stage: 70-80° C. | 65° C./75° C. | 100° C. constant | 100° C. constant | 100° C. constant | 100° C. constant |
| Effect High-strength fiber | Presence or absence of gum: ⊚, ○, X | ⊚ | X | X | ○ | X |
|  | Presence or absence of lamp black: ⊚, ○, X | ⊚ | X | X | ○ | X |
|  | Uniformity of thread diameter: ⊚, ○, X | ⊚ | X | ⊚ | X | X |
|  | Breaking strength of thread: ⊚, ○, X | ⊚ | X | ○ | X | X |
|  | Degree of orientation of thread: ⊚, ○, X | ⊚ | X | ○ | X | X |

INDUSTRIAL APPLICABILITY

The ultrahigh-molecular-weight polyethylene powder of the present invention is excellent in appearance, ease of processing, and reduction in the amount of lamp black during processing. Accordingly, a molded article obtained using the polyethylene powder can be employed in various uses. The molded article is not limited and is suitable for, for example, a microporous membrane for secondary battery separators, particularly, a microporous membrane for lithium ion secondary battery separators, a sintered body, or a high-strength fiber. Examples of the method for producing the microporous membrane include a processing method based on a wet process using a solvent, which involves extrusion in an extruder equipped with a T die, drawing, extraction, and drying.

The molded article can also be used as a molded article obtained by sintering the ethylene polymer, a filter, and a dust collector, etc. by exploiting excellent features such as abrasion resistance, high slidability, high strength, and high impact resistance, which are the properties of the high-molecular-weight ethylene polymer.

Examples of the method for producing the high-strength fiber include a production method which involves kneading and spinning liquid paraffin and the ultrahigh-molecular-weight polyethylene powder, followed by heating and drawing.

Various molded articles thus obtained have industrial applicability.

The invention claimed is:

1. An ultrahigh-molecular-weight polyethylene powder having a viscosity-average molecular weight Mv of $10 \times 10^4$ or higher and $1000 \times 10^4$ or lower, wherein
viscosity-average molecular weight Mv(A) of a kneaded product obtained by kneading under kneading conditions given below and the Mv satisfy the following relationship:

{Mv−Mv(A)}/Mv is 0.20 or less, and the ultrahigh-molecular-weight polyethylene powder contains an ultrahigh-molecular-weight polyethylene powder having a particle size of 212 μm or larger, wherein ultrahigh-molecular-weight polyethylene the powder having a particle size of 212 μm or larger has an average pore volume of 0.6 ml/g or larger and an average pore size of 0.3 μm or larger:
[kneading conditions for obtaining the kneaded product having viscosity-average molecular weight Mv(A)]
raw material:
a mixture containing 5 parts by mass of the ultrahigh-molecular-weight polyethylene powder and 95 parts by mass of liquid paraffin, and further 1 part by mass of an antioxidant per 100 parts by mass in total of the ultrahigh-molecular-weight polyethylene powder and the liquid paraffin, and conditions:
the raw material is kneaded at 130° C. for 30 minutes and then further kneaded at 240° C. for 15 minutes;
the heating rate from 130° C. to 240° C. is set to 22° C./min;
the number of screw rotations is set to 50 rpm; and
the kneading is performed in the nitrogen atmosphere.

2. The ultrahigh-molecular-weight polyethylene powder according to claim 1, wherein a proportion of an ultrahigh-molecular-weight polyethylene powder having a particle size of 53 μm or smaller is less than 40% by mass per 100% by mass of the ultrahigh-molecular-weight polyethylene powder.

3. The ultrahigh-molecular-weight polyethylene powder according to claim 1, wherein a bulk density of the ultrahigh-molecular-weight polyethylene powder having a particle size of 212 μm or larger is 0.20 g/cm³ or higher and 0.60 g/cm³ or lower.

4. The ultrahigh-molecular-weight polyethylene powder according to claim 1, wherein the ultrahigh-molecular-weight polyethylene powder has a magnesium content of 0.1 ppm or higher and 20 ppm or lower.

5. The ultrahigh-molecular-weight polyethylene powder according to claim 1, wherein the ultrahigh-molecular-weight polyethylene powder has a titanium content of 0.1 ppm or higher and 5 ppm or lower.

6. The ultrahigh-molecular-weight polyethylene powder according to claim 1, wherein the ultrahigh-molecular-weight polyethylene powder has an aluminum content of 0.5 ppm or higher and 10 ppm or lower.

7. The ultrahigh-molecular-weight polyethylene powder according to claim 1, wherein the ultrahigh-molecular-weight polyethylene powder has a silicon content of 0.1 ppm or higher and 100 ppm or lower.

8. The ultrahigh-molecular-weight polyethylene powder according to claim 1, wherein the ultrahigh-molecular-weight polyethylene powder has a chlorine content of 1 ppm or higher and 50 ppm or lower.

9. The ultrahigh-molecular-weight polyethylene powder according to claim 1, wherein a content ratio between magnesium and titanium (Mg/Ti) is 0.1 or more and 10 or less.

10. The ultrahigh-molecular-weight polyethylene powder according to claim 1, wherein a content ratio between aluminum and titanium (Al/Ti) is 0.1 or more and 20 or less.

11. A high-strength fiber comprising the ultrahigh-molecular-weight polyethylene powder according to claim 1.

12. A microporous membrane for a secondary battery separator comprising the ultrahigh-molecular-weight polyethylene powder according to claim 1.

13. The ultrahigh-molecular-weight polyethylene powder according to claim 2, wherein a bulk density of the ultrahigh-molecular-weight polyethylene powder having a particle size of 212 μm or larger is 0.20 g/cm³ or higher and 0.60 g/cm³ or lower.

14. The ultrahigh-molecular-weight polyethylene powder according to claim 2, wherein the ultrahigh-molecular-weight polyethylene powder has a titanium content of 0.1 ppm or higher and 5 ppm or lower.

15. The ultrahigh-molecular-weight polyethylene powder according to claim 3, wherein the ultrahigh-molecular-weight polyethylene powder has a titanium content of 0.1 ppm or higher and 5 ppm or lower.

16. The ultrahigh-molecular-weight polyethylene powder according to claim 13, wherein the ultrahigh-molecular-weight polyethylene powder has a titanium content of 0.1 ppm or higher and 5 ppm or lower.

17. The ultrahigh-molecular-weight polyethylene powder according to claim 2, wherein the ultrahigh-molecular-weight polyethylene powder has an aluminum content of 0.5 ppm or higher and 10 ppm or lower.

18. The ultrahigh-molecular-weight polyethylene powder according to claim 3, wherein the ultrahigh-molecular-weight polyethylene powder has an aluminum content of 0.5 ppm or higher and 10 ppm or lower.

19. The ultrahigh-molecular-weight polyethylene powder according to claim 5, wherein the ultrahigh-molecular-weight polyethylene powder has an aluminum content of 0.5 ppm or higher and 10 ppm or lower.

20. The ultrahigh-molecular-weight polyethylene powder according to claim 15, wherein the ultrahigh-molecular-weight polyethylene powder has an aluminum content of 0.5 ppm or higher and 10 ppm or lower.

* * * * *